(12) United States Patent
Itatani et al.

(10) Patent No.: US 7,378,062 B2
(45) Date of Patent: May 27, 2008

(54) OBJECT PROCESSING APPARATUS AND PLASMA FACILITY COMPRISING THE SAME

(75) Inventors: Ryohei Itatani, Kyoto (JP); Mikio Deguchi, Ehime (JP); Bencherki Mebarki, Champs-sur-Marne (FR); Toshihiko Toda, Ehime (JP); Heitaro Ban, Ehime (JP); Toshiaki Ishikawa, deceased, late of Kyoto (JP); by Ryohei Itatani, legal representative, Kyoto (JP)

(73) Assignees: Three Tec Co., Ltd., Ehime (JP); Youth Engineering Co., Ltd., Ehime (JP)

( * ) Notice: Subject to any disclaimer, the term of this patent is extended or adjusted under 35 U.S.C. 154(b) by 336 days.

(21) Appl. No.: 10/276,301

(22) PCT Filed: May 28, 2001

(86) PCT No.: PCT/JP01/04437

§ 371 (c)(1),
(2), (4) Date: Nov. 22, 2002

(87) PCT Pub. No.: WO01/91896

PCT Pub. Date: Dec. 6, 2001

(65) Prior Publication Data

US 2004/0020598 A1  Feb. 5, 2004

(51) Int. Cl.
*B01J 19/08* (2006.01)

(52) U.S. Cl. .................................. 422/186.04

(58) Field of Classification Search ............ 422/186.04
See application file for complete search history.

(56) References Cited

U.S. PATENT DOCUMENTS

| | | | | | |
|---|---|---|---|---|---|
| 5,466,424 | A | * | 11/1995 | Kusano et al. | 422/186.05 |
| 5,560,890 | A | * | 10/1996 | Berman et al. | 422/186.04 |
| 5,980,701 | A | * | 11/1999 | Sharma et al. | 204/165 |
| 6,159,432 | A | * | 12/2000 | Mallinson et al. | 422/186.04 |
| 6,730,275 | B2 | * | 5/2004 | Sharma et al. | 422/186.04 |

FOREIGN PATENT DOCUMENTS

| | | |
|---|---|---|
| JP | 05-015737 | 1/1993 |
| JP | 05-015737 A * | 1/1993 |

(Continued)

OTHER PUBLICATIONS

European Search Report dated Jun. 16, 2004.

(Continued)

*Primary Examiner*—Kishor Mayekar
(74) *Attorney, Agent, or Firm*—Kratz, Quintos & Hanson, LLP

(57) ABSTRACT

A processing apparatus for subject of the present invention uses a high voltage electrode and a ground electrode, and generates plasma under atmospheric pressure in a reaction passage through which a to-be-processed subject passes. For example, even fluorocompound such as PFC including $CF_4$ can effectively be decomposed because the fluorocompound is brought into contact with plasma in a small space for sufficient time, and the apparatus has a small and simple structure. Therefore, the apparatus can be added to each process chamber.

21 Claims, 25 Drawing Sheets

FOREIGN PATENT DOCUMENTS

| | | |
|---|---|---|
| JP | 07-047224 | 2/1995 |
| JP | 07-047224 A * | 2/1995 |
| JP | 09-148096 | 6/1997 |
| JP | 9-262459 | 10/1997 |
| JP | 09-262459 | 10/1997 |
| JP | 11-156156 | 6/1999 |
| JP | 11-156156 A * | 6/1999 |
| WO | WO00/25557 | 5/2000 |

OTHER PUBLICATIONS

International Search Report for corresponding patent application No. PCT/JP01/04437 dated Sep. 4, 2001.

* cited by examiner gas ballast N2 shaft seal N2

OBJECT PROCESSING APPARATUS AND PLASMA FACILITY COMPRISING THE SAME

This application is a 35 USC 371 National Stage of PCT/JP01/04437 filed on May 28, 2001.

TECHNICAL FIELD

The present invention relates to a processing apparatus for subject and a plasma system using the same. It is conceived that gas exhausted from a process chamber, which carries out plasma processing, such as mainly gas including halogen element, more concretely, PFC gas such as $CF_4$ (chlorofluorocarbon 14) and $C_4F_8$ (chlorofluorocarbon 318), and CxHyFz, CxHyClz, CxFyClz, CwFxClyBrz, $SF_6$, $NF_3$, $CCl_4$ and the like (w, x, y, z are integers) adversely influences the global environment such as by global warming, destruction of the ozone layer, etc. Among them, PFC (perfluorocarbon) is extremely stable and thus, if this gas is not decomposed and is exhausted into atmosphere, damage is great.

The above gas is mainly used for an etching apparatus, but when an inner wall of a CVD apparatus is cleaned or when an interior of a PVD apparatus is cleaned, the above-described etching gas is used.

It is a main object of the present invention to decompose the above-described etching gas, but other than this, the invention is also applied to processing of harmful gas and harmful solid or liquid material if they can be decomposed. Further, the present invention is mainly applied to the above-described etching apparatus, and the CVD apparatus and the PVD apparatus when they are cleaned, but other than those, the invention is also applied to various kinds of plasma systems which discharge harmful materials which can be abated.

BACKGROUND TECHNIQUE

According to most of conventional processing methods of exhaust gas, the gas is processed by a chemical method under atmospheric pressure. Normally, in these processing steps, gas exhausted from each reaction apparatus is collected and collectively processed under normal atmospheric pressure. That is, cleaning of gas and other chemical process are carried out using water by a scrubber or the like.

According to such a chemical processing method, however, a to-be-processed subject processing system becomes greater than a producing system in scale in some cases, and this is not practical economically.

On the other hand, there is also proposed a method for electrically processing the exhaust gas. For example, Japanese Patent Publication No. H4-80723 relates to processing of CVD gas. In this publication, magnetic field is applied to a plasma generation space, various exhaust gases are decomposed and solidified and collected.

According to this electrically processing method, however, an apparatus for applying the magnetic field is required, and its structure is not always simple and small. Further, gas to be decomposed is CVD gas, and this method can not efficiently decompose PFC gas which is highly required to be rendered harmless in recent years. Further, since this conventional example is limited to the electric discharge under a reduced pressure atmosphere, its apparatus must be disposed between a high-vacuum pump and a roughing vacuum pump. Furthermore, it is troublesome to separately collect the solidified gas at much expense in effort.

In view of the above circumstances, it is an object of the present invention to provide a processing apparatus for subject and a plasma system using the same in which the apparatus has small and simple structure, the apparatus can be added to a plasma system, the apparatus is inexpensive and can be operated without taking many hands, the apparatus does not damage an auxiliary system such as a pump, and decomposing efficiency of harmful material, especially PFC gas is high.

DISCLOSURE OF THE INVENTION

A first aspect of the present invention provides a processing apparatus for subject wherein using a high voltage electrode and a ground electrode, plasma is generated under atmospheric pressure in a reaction passage through which a to-be-processed subject passes.

According to this aspect, exhaust gas is decomposed when the gas passes through plasma generated in the reaction passage. At that time, since the plasma fills the reaction passage over its entire cross section, the gas can not pass through the plasma without being excited and reacting, and the gas components are decomposed efficiently. Especially fluorocompound such as PFC including $CF_4$ is extremely stable and thus, a usual processing method serves no purpose. According to the method of the present invention, since the fluorocompound is brought into contact with the plasma in a small space for sufficient time, the fluorocompound can effectively be decomposed. A basic structure of the invention is that the pair of electrodes are provided in the reaction passage, and the apparatus is operated under atmospheric pressure. Therefore, the structure of the apparatus can be made small and simple, and the apparatus can be easily added to each processing machine.

According to a second aspect of the invention, in the processing apparatus for subject of the first aspect, the reaction passage is formed of the ground electrode, the high voltage electrode is disposed on a flow-in side of the reaction passage.

With this aspect, a thin and long reaction passage becomes a plasma generating space, and plasma is generated in a longitudinal direction of the reaction passage. The exhaust gas is influenced by plasma while passing through a long distance in a narrow cross section and thus, the decomposition efficiency of the exhaust gas becomes high.

According to a third aspect of the invention, in the processing apparatus for subject of the first aspect, the reaction passage is formed of the ground electrode, a plasma chamber is disposed on a flow-out side of the reaction passage, an adsorbent for adsorbing a decomposition product is put in the plasma chamber.

With this aspect, if an adsorbent is charged into the plasma chamber on the outlet side of the reaction passage, the decomposed gas components can be collected.

According to a fourth aspect of the invention, in the processing apparatus for subject of the first aspect, the reaction passage is formed of the ground electrode, a plasma chamber is disposed on a flow-out side of the reaction passage, powder adsorbent into which wool-like buffering agent is mixed is put in the plasma chamber.

With this aspect, if the wool-like buffering agent is used, it is possible to disperse the powder adsorbent in the plasma chamber substantially uniformly and thus, the gas can be collected effectively.

According to a fifth aspect of the invention, in the processing apparatus for subject of the first aspect, the to-be-processed subject is brought into contact with water or water vapor on a flow-out side of the reaction passage.

With this aspect, since water or water vapor is supplied in the vicinity of plasma, a water-soluble reaction product in the exhaust gas can swiftly be eliminated from vapor phase, and decomposition can be facilitated.

According to a sixth aspect of the invention, in the processing apparatus for subject of the first aspect, the to-be-processed subject is brought into contact with water or water vapor in the reaction passage.

With this aspect, since the plasma generated in the reaction passage is allowed to contact water or water vapor, the reaction time of plasma becomes long, and decomposition can further be facilitated.

According to a seventh aspect of the invention, in the processing apparatus for subject of the first aspect, one end of the reaction passage is an insulating material and the other end thereof is a ground electrode, the high voltage electrode is disposed on a side of the insulating material.

With this aspect, even if the amount of flow of the exhaust gas is small, it is possible to fully fill the reaction passage with plasma.

According to an eighth aspect of the invention, in the processing apparatus for subject of the first aspect, a reaction passage is formed of an insulating material between the high voltage electrode and the ground electrode, the high voltage electrode is disposed on a flow-in side of the reaction passage, a water reservoir is provided on a flow-out side of the reaction passage.

With this aspect, since water in the water reservoir becomes a liquid electrode, plasma is generated between the high voltage electrode and the water surface, and the exhaust gas is decomposed while passing through this plasma region. Among the decomposed components, water-soluble component is collected in water and thus, the water-soluble component can be exhausted together with water and disposed.

According to a ninth aspect of the invention, in the processing apparatus for subject of the eighth aspect, the water reservoir is disposed on an upper surface of the ground electrode, a flow-out side end of the reaction passage is disposed below a water surface in the water reservoir, and a flow-in side end of the reaction passage is formed with an inclined surface whose outer periphery side is inclined downward.

With this aspect, plasma is generated between water in the water reservoir and the high voltage electrode, and the exhaust gas is decomposed by the plasma. Water which was evaporated from water surface below the reaction passage made of insulating material is returned into the water reservoir through an outside of a substantially truncated conical insulating material. Therefore, a waterdrop is not attached to the reaction passage, and disturbance is prevented from being applied to electric discharge.

According to a tenth aspect of the invention, in the processing apparatus for subject of the eighth aspect, water or water vapor is supplied to the flow-out side of the reaction passage, water after it was brought into contact with plasma is discharged.

With this aspect, since plasma generated in the reaction passage is allow to approach and water or water vapor is supplied, the reaction with water becomes most active, and decomposition of the exhaust gas can be facilitated.

According to an eleventh aspect of the invention, in the processing apparatus for subject of the first aspect, a waterway is provided around the reaction passage, water which passes through the waterway and which is heated is supplied into the reaction passage.

With this aspect, since hot water or water vapor which was heated while passing through the waterway can be supplied into the reaction passage, reaction between plasma and water is effectively carried out, and decomposition is facilitated.

A twelfth aspect of the invention provides a processing apparatus for subject in which using a high voltage electrode and a ground electrode, plasma is generated under atmospheric pressure in a reaction passage through which a to-be-processed subject passes, wherein the high voltage electrode is disposed on the flow-in side of the reaction passage, the ground electrode is disposed in the reaction passage, water is allowed to flow downward along an inner wall of the reaction passage.

With this aspect, since the ground electrode is provided in the gas passage, plasma can be formed a long the reaction passage, and the reaction passage can be fully filled with plasma over the entire cross section. Therefore, the contact area with harmful material which passes through the reaction passage becomes large, the harmful material and plasma can be reacted reliably and thus, decomposition of the harmful material can be carried out efficiently. Especially fluorocompound such as PFC including $CF_4$ is extremely stable and thus, a usual processing method serves no purpose. According to the method of the present invention, since the fluorocompound is brought into contact with the plasma in a small space for sufficient time, the fluorocompound can effectively be decomposed. A basic structure of the invention is that the pair of electrodes is provided in the reaction passage, and the apparatus is used under atmospheric pressure. Therefore, the structure of the apparatus can be made small and simple, and the apparatus can be added to each process chamber. Further, since a water layer is formed over the entire surface of the inner wall of the reaction passage, plasma and water are brought into contact with each other over a wide area. Therefore, water vapor which was generated by contact between plasma and water can efficiently be entangled into plasma. Thus, the decomposition of the harmful material is facilitated, and water-soluble rection product can be absorbed by water efficiently. Therefore, decomposition and separation efficiency of the harmful material can be enhanced.

According to a thirteenth aspect of the invention, in the processing apparatus for subject of the twelfth aspect, a water reservoir is provided around the reaction passage.

With this aspect, since it is possible to prevent a temperature of a wall surface of the reaction passage from excessively rising, it is possible to prevent all of water flowing down through the reaction passage inner wall from being evaporated. Therefore, since the reaction passage inner wall is always covered with the water layer, it is possible to prevent erosion of the reaction passage inner wall which may be caused by reactive species.

According to a fourteenth aspect of the invention, in the processing apparatus for subject of the twelfth aspect, the ground electrode is provided on the inner wall of the reaction passage.

With this aspect, since the ground electrode is provided along the inner surface of the reaction passage, water flows along the inner surface of the ground electrode. Therefore, the ground electrode is automatically cooled, and it is possible to suppress the erosion of the electrode. Further, since a harmful material passes through inside the water layer formed on the inner surface of the ground electrode, the ground electrode does not act as a resistance when the harmful material flows through the reaction passage.

According to a fifteenth aspect of the invention, in the processing apparatus for subject of the twelfth aspect, the ground electrode is provided on a center axis of the reaction passage.

With this aspect, since the ground electrode comes into contact directly with plasma, power loss caused by water resistance can be eliminated.

According to a sixteenth aspect of the invention, in the processing apparatus for subject of the twelfth aspect, the ground electrode is movably provided in a longitudinal direction of the reaction passage.

With this aspect, if the ground electrode is brought closer to the high voltage electrode when electrical discharge is started, plasma can be formed easily. Further, if the ground electrode is moved away from the high voltage electrode after the plasma is formed, a length of the plasma is increased, a space where the plasma and a harmful material are reacted can be increased and thus, decomposition and separation efficiency of the harmful material can be enhanced.

According to a seventeenth aspect of the invention, in the processing apparatus for subject of the twelfth aspect, the plural ground electrodes are provided.

With this aspect, if the ground electrode which is close to the high voltage electrode is energized when electrical discharge is started, plasma can be formed easily. After plasma is formed, if a ground electrode to be energized is changed to a ground electrode which is away from the high voltage electrode in sequence, a length of the plasma can be increased. Therefore, since the space where the plasma and a harmful material are reacted can be increased, decomposition and separation efficiency of the harmful material can be enhanced. Further, since the length of plasma can be changed only by changing an electrode to be energized, a structure of the apparatus can be simplified.

According to an eighteenth aspect of the invention, in the processing apparatus for subject of the twelfth aspect, the high voltage electrode is provided such that it can move toward and away from the reaction passage.

With this aspect, if the high voltage electrode is moved toward the reaction passage when electrical discharge is started, plasma can be formed easily. After plasma is formed, if the high voltage electrode is moved away from the reaction passage, a length of the plasma can be increased. Therefore, since the space where the plasma and a harmful material are reacted can be increased, decomposition and separation efficiency of the harmful material can be enhanced. When the harmful material is gas, an amount of reaction between plasma and a harmful material whose flowing speed is slow before the harmful material enteres the reaction passage can be increased. Thus, the decomposition efficiency of the harmful material can be enhanced.

According to a nineteenth aspect of the invention, in the processing apparatus for subject of the twelfth aspect, the high voltage electrode is made of platinum.

With this aspect, it is possible to keep a surface of the high voltage electrode chemically stable, and it is possible to prevent erosion of the electrode which may be caused by the harmful material.

According to a twentieth aspect of the invention, in the processing apparatus for subject of the twelfth aspect, the water is allowed to flow out from the flow-out side of the reaction passage.

With this aspect, a water-soluble reaction product discharged from the flow-out side of the reaction passage can efficiently be absorbed by water and removed, and it is possible to prevent the exhaust side of the apparatus from being damaged by heat.

A twenty-first aspect of the invention provides a plasma system using a processing apparatus for subject in which using a high voltage electrode and a ground electrode, plasma is generated under atmospheric pressure in a reaction passage through which a to-be-processed subject passes, wherein a high vacuum pump is connected to an exhaust pipe of a process chamber which carries out plasma processing, a roughing vacuum pump in which a plurality of pumping units are connected to each other in series is connected to the exhaust pipe of the high vacuum pump, the processing apparatus for subject is connected to the exhaust pipe of the roughing vacuum pump.

With this aspect, the exhaust gas in the process chamber is evacuated by the highvacuum pump and the roughing vacuum pump, and is decomposed under atmospheric pressure just before the exhaust gas is exhausted into atmosphere. Therefore, the processing apparatus for subject can be reduced in size. Further, the exhaust gas is processed on the flow-out side of the roughing vacuum pump, hazardous byproduct does not reversely flow toward the process chamber, and the plasma system is not damaged or its lifetime is not shortened. The electrical discharge under atmospheric pressure can shorten a distance between electrodes according to the similarity law as compared with a case under low vacuum, and as a result, the apparatus can be reduced in size. Therefore, it is easy to add the apparatus to each processing machine.

According to a twenty-second aspect of the invention, in the plasma system of the twenty-first aspect, the processing apparatus for subject is inserted between the plurality of pumping units which constitutes the roughing vacuum pump.

With this aspect, gas which was not decomposed by a first processing apparatus for subject provided in the roughing vacuum pump can be decomposed by a second processing apparatus on the flow-out side of the roughing vacuum pump. Therefore, it is possible to further enhance the decomposing efficiency of exhaust gas.

BEST MODE FOR CARRYING OUT THE INVENTION

Next, embodiments of the present invention will be explained based on the drawings.

First, an entire structure of a plasma system to which a processing apparatus for subject of the invention is applied will be explained.

Figure 1:
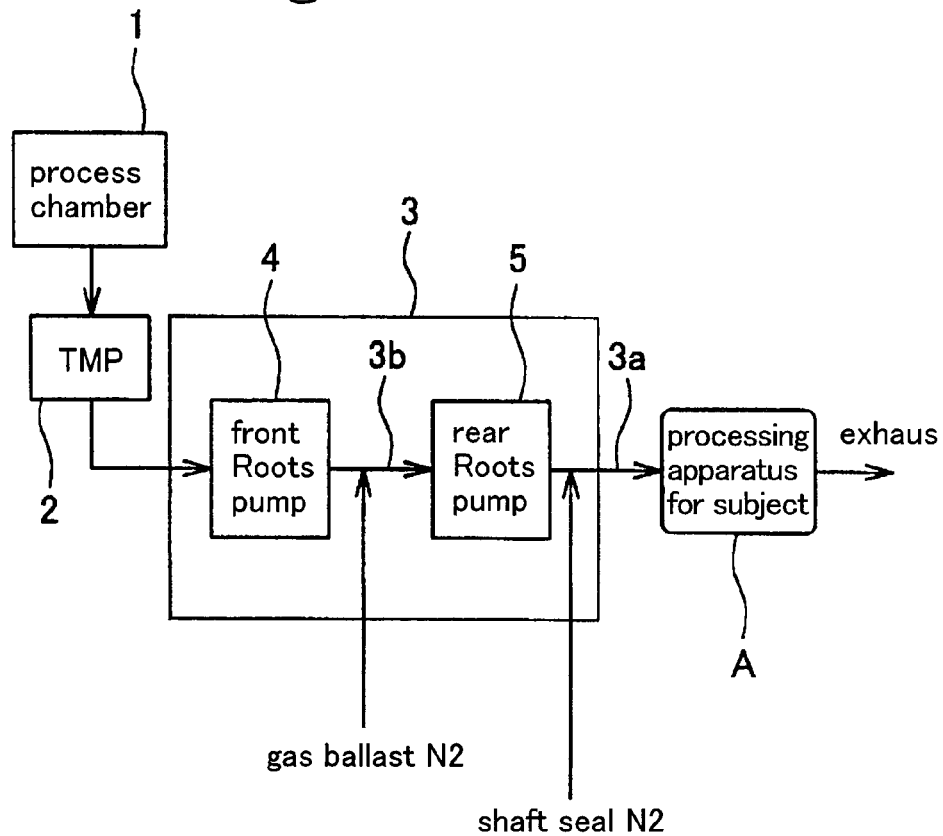
FIG. 1 is a block diagram of a plasma system according to an embodiment of the present invention.

FIG. 1 is a block diagram of the plasma system according to an embodiment of the invention.

In FIG. 1, a process chamber 1 carries out plasma processing. The process chamber in this invention mainly means a process chamber of an etching apparatus, but also includes a process chamber for a PVD and a CVD apparatus when apparatus is cleaned using etching gas, and also includes all process chambers which discharge a harmful material which can be decomposed by a later-described processing apparatus for subject A of the present invention.

A high vacuum pump 2 and a roughing vacuum pump unit 3 are connected to an exhaust pipe of the process chamber 1 in this order. The high vacuum pump 2 is comprised with a known turbo molecular pump (TMP). The roughing vacuum pump unit 3 comprises known Roots pumps 4 and 5 which are connected to each other in series. To evacuate the process chamber 1, the process chamber 1 is evacuated by the roughing vacuum pump unit 3 to some degree and then, the process chamber 1 is further evacuated by the high vacuum pump 2 to such low vacuum that is required for processing. During processing, gas in the process chamber 1 is exhausted into atmosphere successively. A known plasma system includes all of the above-described structures. The present invention is characterized in that a processing apparatus for subject A is connected to an exhaust pipe 3a on the flow-out side of the roughing vacuum pump unit 3.

As shown in FIG. 1, a gas ballast $N_2$ is injected to an exhaust pipe 3b between the upstream Roots pump 4 and the downstream Roots pump 5. A shaft seal $N_2$ is injected to the exhaust pipe of the flow-out side of the downstream Roots pump 5. This gas ballast $N_2$ is nitrogen ($N_2$). Although exhaust gas does not come into contact with oil, the gas ballast $N_2$ is injected from an intermediate portion of the pump to dilute the exhaust gas so as to prevent some particle from being generated and making the rotor dirty, and to prevent powder from being generated. The shaft seal $N_2$ is also nitrogen ($N_2$), and the shaft seal $N_2$ is injected to prevent the exhaust gas from leaking outside from a portion of the pump through which a rotation shaft for driving the rotor of the pump passes.

Details of the processing apparatus for subject A will be described later. Its basic structure comprises a reaction passage 13 through which a harmful material such as exhaust gas exhausted from the process chamber 1 which carries out the plasma processing, a high voltage electrode 12 and a ground electrode 11 which generates plasma under atmospheric pressure over the entire cross section in the reaction passage 13 (see FIG. 3).

Therefore, according to the plasma system shown in FIG. 1, a harmful material exhausted from the roughing vacuum pump unit 3 is physically and chemically decomposed in a plasma space generated between the high voltage electrode 12 and the ground electrode 11 in the processing apparatus for subject A, the decomposed harmful material is exhausted into atmosphere in a gas state and thus, the decomposed harmful material does not flow reversely toward the roughing vacuum pump unit 3 and the process chamber 1 again. Thus, the plasma system has a merit that disturbance is not generated in the plasma process.

Further, since the processing apparatus for subject A is disposed in a portion of atmospheric pressure on the exhaust side, the processing apparatus for subject A has the following merits:
(a) Unlike a case in which the apparatus is disposed between a high vacuum pump and a roughing vacuum pump, even if the apparatus is inserted into an exhaust path of the pump, there is no fear that the process itself is adversely influenced, and it is possible to simply add the apparatus to an existing process line.
(b) Although components such as HF and $H_2O$, which adversely influence the pump, are included in by-products of plasma reaction, such components do not pass through the pump.
(c) Since the electrical discharge under atmospheric pressure is used, it is possible to shorten a distance between electrodes according to the similarity law as compared with a case under a low vacuum, and this is advantageous in terms of miniaturization of the apparatus.
(d) Even if moisture or vapor is used in the processing apparatus for subject A, such moisture or vapor does not approach upstream of the roughing vacuum pump unit 3. Therefore, the Roots pumps 4 and 5 and the like are not damaged.

Next, a plasma system of another embodiment of the present invention will be explained based on FIG. 2.

Figure 2:
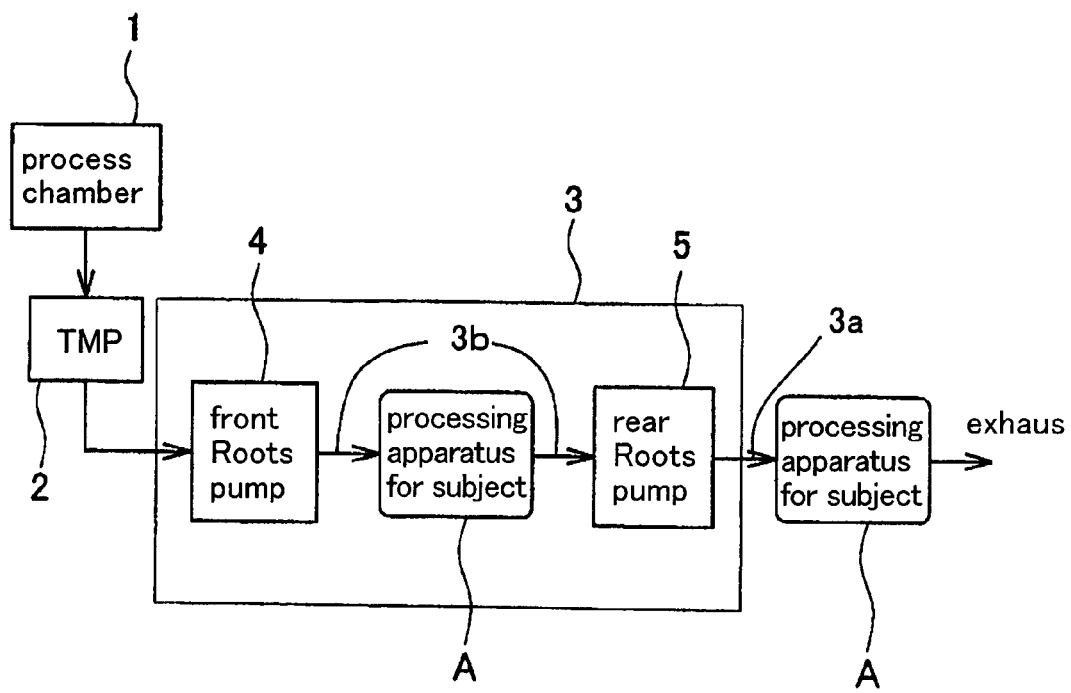
FIG. 2 is a block diagram of a plasma system of another embodiment of the invention.

In FIG. 2, the process chamber 1, the high vacuum pump 2, the roughing vacuum pump unit 3 and the Roots pumps 4 and 5 which constitute the roughing vacuum pump unit 3 are substantially the same as those shown in FIG. 1. In this embodiment, a first processing apparatus for subject A is provided on the exhaust side of the roughing vacuum pump unit 3, and an auxiliary second processing apparatus for subject A is added between the Roots pumps 4 and 5 in the roughing vacuum pump unit 3. FIG. 1 shows a basic structure of the present invention, and FIG. 2 shows its developed style.

However, the second processing apparatus for subject A disposed in the roughing vacuum pump unit 3 must be an apparatus which does not use water or vapor. This is because that if water or vapor is leaked, the pumps and bearings used in the pumps are damaged.

In the plasma system shown in FIG. 2, gas is primary processed by the processing apparatus for subject A in the roughing vacuum pump unit 3 and then, the gas is secondary processed by the processing apparatus for subject A on the flow-out side of the roughing vacuum pump unit 3. Therefore, the exhaust gas can be decomposed almost completely.

Various embodiments of the processing apparatus for subject A used in the above plasma system will be explained based on FIGS. 3 to 28.

The structure of the entire processing apparatus for subject A and technical idea which is common to other embodiments will be explained based on the embodiment shown in FIG. 3, and only features of each embodiment will be partially explained after FIG. 4. Parts having the same function are designated with the same symbols, and explanation thereof is omitted.

Figure 3:
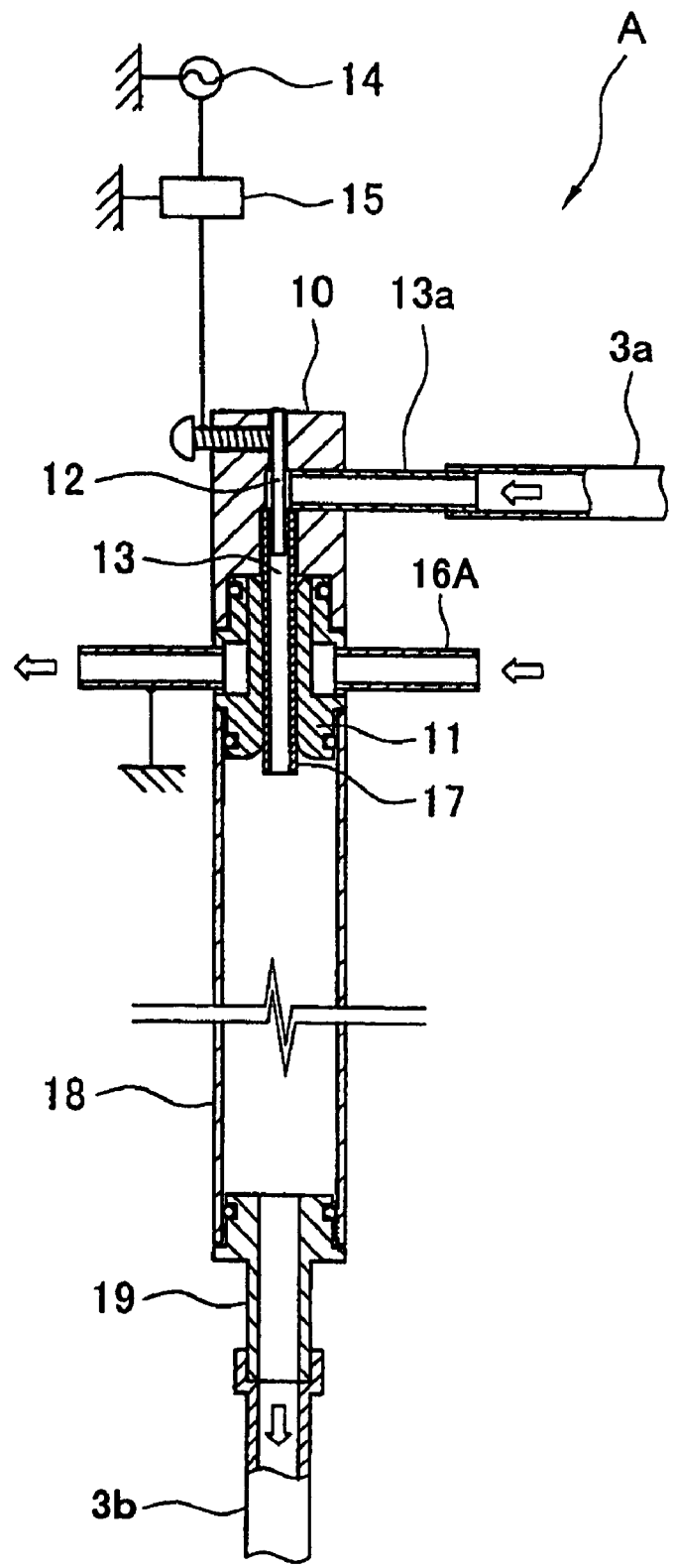
FIG. 3 is a vertical sectional view showing an embodiment of a processing apparatus for subject A of the invention.

Embodiment shown in FIG. 3

A reference number 10 represents a body case. The ground electrode 11 and the high voltage electrode 12 are held in this order by the body case 10 from downstream toward upstream in a flowing direction of exhaust gas. The ground electrode 11 is formed at its central portion with a pipe, i.e., thin and long reaction passage 13. The high voltage electrode 12 is disposed on a center axis of the reaction passage 13 in the vicinity of its flow-in side. In this embodiment, an end of the high voltage electrode 12 is inserted into the reaction passage 13. A DC high voltage power supply or AC high frequency power supply 14 is connected to the high voltage electrode 12 through a matching circuit 15. The reaction passage 13 is provided with an introducing pipe 13a for introducing exhaust gas to be processed, and the introducing pipe 13a is connected to the exhaust pipe 3a in the roughing vacuum pump unit 3. A plasma chamber 18 is mounted to the ground electrode 11 on the opposite side from the body case 10. An outlet port of the plasma chamber 18 is opened into atmosphere or connected to an exhaust pipe 3b in the roughing vacuum pump unit 3 through a connector 19. The exhaust gas enters a circumference of the high voltage electrode 12 in the body case 10 from the introducing pipe 13a, and passes through the plasma chamber 18 through the reaction passage 13 and exits from the connector 19. Plasma is generated by electrical discharge of the high voltage electrode 12 in the thin and long reaction passage 13 in the ground electrode 11, and when the exhaust gas passes through the narrow cross section, the exhaust gas is decomposed by plasma into various gas components.

In this embodiment, the ground electrode 11 is made of metal, and the material of the ground electrode 11 has preferably high conductivity such as brass or copper, but the material is not limited to those only if the material has a function to generate plasma. Preferable examples of the high voltage electrode 12 are a metal pipe metal rod, a carbon rod, a Pt rod, a Ti—Pd alloy rod and the like, but the material of the high voltage electrode 12 is not limited to those only if the material has a function to generate plasma.

The plasma chamber 18 can be filled with various adsorbents. If the plasma chamber 18 is filled with $Ca(OH)_2$, it is possible to adsorb F(Fluorine) which is generated by decomposing $CF_4$ in the exhaust gas. It is preferable that the plasma chamber 18 is detachable and attachable because it is easy to handle the plasma chamber 18.

Cooled and not cooled ground electrode 11 and high voltage electrode 12 are included in the present invention. If the cooled ground electrode 11 and high voltage electrode 12 are used, it is effective for continuous operation because a temperature is prevented from increasing. A cooling method thereof is not limited only if the function of processing a to-be-processed subject is not hindered. For example, a cooling water may be supplied into or drained from a pipe-like high voltage electrode 12, a pipe may be mounted around the ground electrode 11 and cooling water may flow therethrough, an annular waterway may be formed around an outer periphery of the ground electrode 11 and a water supplying/drainig pipe 16A may be connected to the waterway, and cooling water may flow therethrough.

A protection pipe 17 may be put in the reaction passage 13 formed by the ground electrode 11. The protection pipe 17 will be described later as ceramic pipes 22 and 24, and a ceramic insulative pipe is used as the protection pipe 17 for preventing erosion. As shown in FIG. 3, if one end of the protection pipe 17 is allowed to extend such as to cover a tip end of the high voltage electrode 12, abnormal discharge is less prone to be generated.

The processing apparatus for subject A of the present invention is used in an environment in which plasma is discharged under substantially atmospheric pressure. It is the object of the present apparatus to decompose and eliminate harmful gas by plasma. Therefore, a condition required for the electrical discharge is that exhaust gas passing through the apparatus reliably passes through the plasma region, and the exhaust gas does not pass without stopping without receiving energy of electrical discharge. For this purpose, it is necessary to satisfy one of the following conditions:

(1) Plasma is continuously generated (there is no instant at which plasma goes out); and
(2) Even if there is an instant at which plasma goes out, a staying time of gas molecule in the plasma region (time required for the gas molecule to pass through the plasma region) is longer than an instant at which the plasma goes out.

It is preferable that the power supply 14 and the reaction passage 13 constituting the plasma region satisfy the following conditions.

First, the power supply preferably has DC or high frequency of about frequency 10 kHz or higher. A reason thereof is as follows.

Generally, when a DC electric field is applied between electrodesunder atmospheric pressure, it is said that voltage of about 30 kV per a distance of 1 cm is required for generating electrical discharge. In an actual electrical discharging apparatus, an electrode certainly has an edge, an electric field at that portion becomes strong, voltage required for the electrical discharge becomes lower than the electric field, and the electrical discharge is generated at about 10 kV when a distance between electrodes is 1 cm in some cases. This is in the case of DC, but also in AC of about commercial frequency, the condition is the same. However, in a region where the frequency exceeds some ten kHz, voltage required for electrical discharge becomes smaller.

In summary, DC electrical discharge satisfies the condition (1). However, secondary problems, that cathode is heated, power loss caused by stable resistance of electrical discharge is large, and high voltage DC power supply is required are caused. For this reason, it is preferable to use AC voltage, but in order to sufficiently satisfy the condition (2), higher frequency is advantageous. In any cases, although voltage and frequency for the electrical discharge are suitably in the above ranges, in reality, an optimal value maybe obtained by experiment or design based on a distance between electrodes of an actual apparatus.

In order to decompose the exhaust gas, it is preferable that the entire cross section of a path through which gas passes is filled with plasma. A diameter of plasma generated by electrical discharge depends upon a magnitude of current, but if the reaction passage 13 is made thin, plasma is spread over the entire cross section of the reaction passage 13, and exhaust gas to be processed passes through the plasma region without fail. At the thinned portion, a temperature of plasma is increased and thus, the decomposition of gas molecule to be processed in the plasma is further facilitated. Therefore, the reaction passage 13 which generates plasma has a thin and long cross section. However, if the cross section is thin or long, a resistance of gas flow becomes great and thus, its numeric value can not be determined sweepingly. Therefore, its optimal value may be obtained by experiment or design. A preferable inner diameter of the reaction passage is about 3 to 5 mm in terms of spreading manner of plasma of electrical discharge under atmospheric pressure.

Next, another embodiment of the processing apparatus for subject A will be explained based on FIGS. 4 to 28. Only structure peculiar to each embodiment will be explained below.

Figure 4:
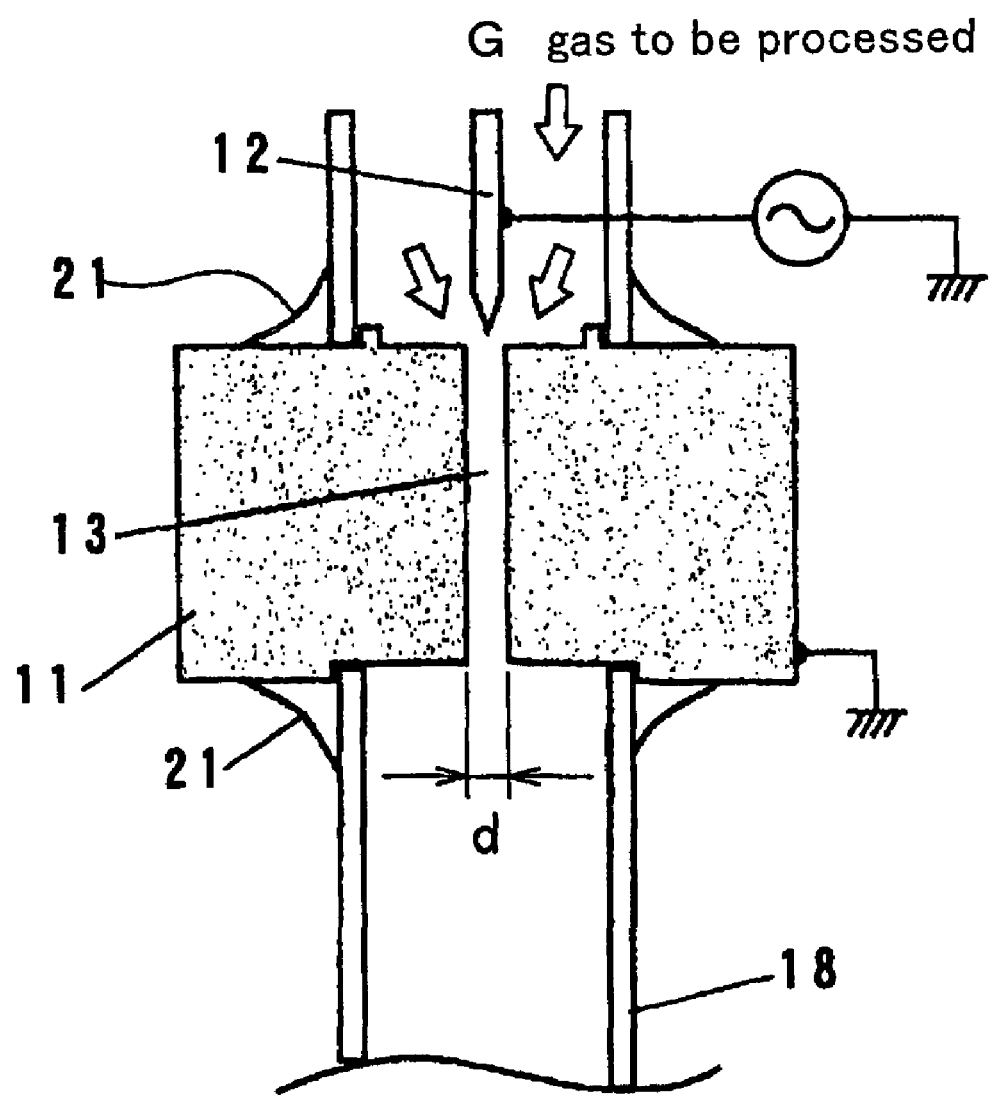
FIG. 4 is a sectional view of an essential portion showing another embodiment of the processing apparatus for subject A.

Embodiment shown in FIG. 4

In this embodiment, the reaction passage 13 is not provided with protection pipe, and the reaction passage 13 is constituted by the ground electrode 11. As shown in this embodiment, an end of the high voltage electrode 12 may not always be inserted into the reaction passage 13. A diameter d of the reaction passage 13 is 3 mm, and a length thereof is 20 mm. If such a thin and long plasma region is provided in this manner, the decomposition of exhaust gas molecule is further facilitated.

A reference number 21 represents a sealing material for preventing gas from leaking between the ground electrode 11 and the plasma chamber 18 or body case 10.

Figure 5:
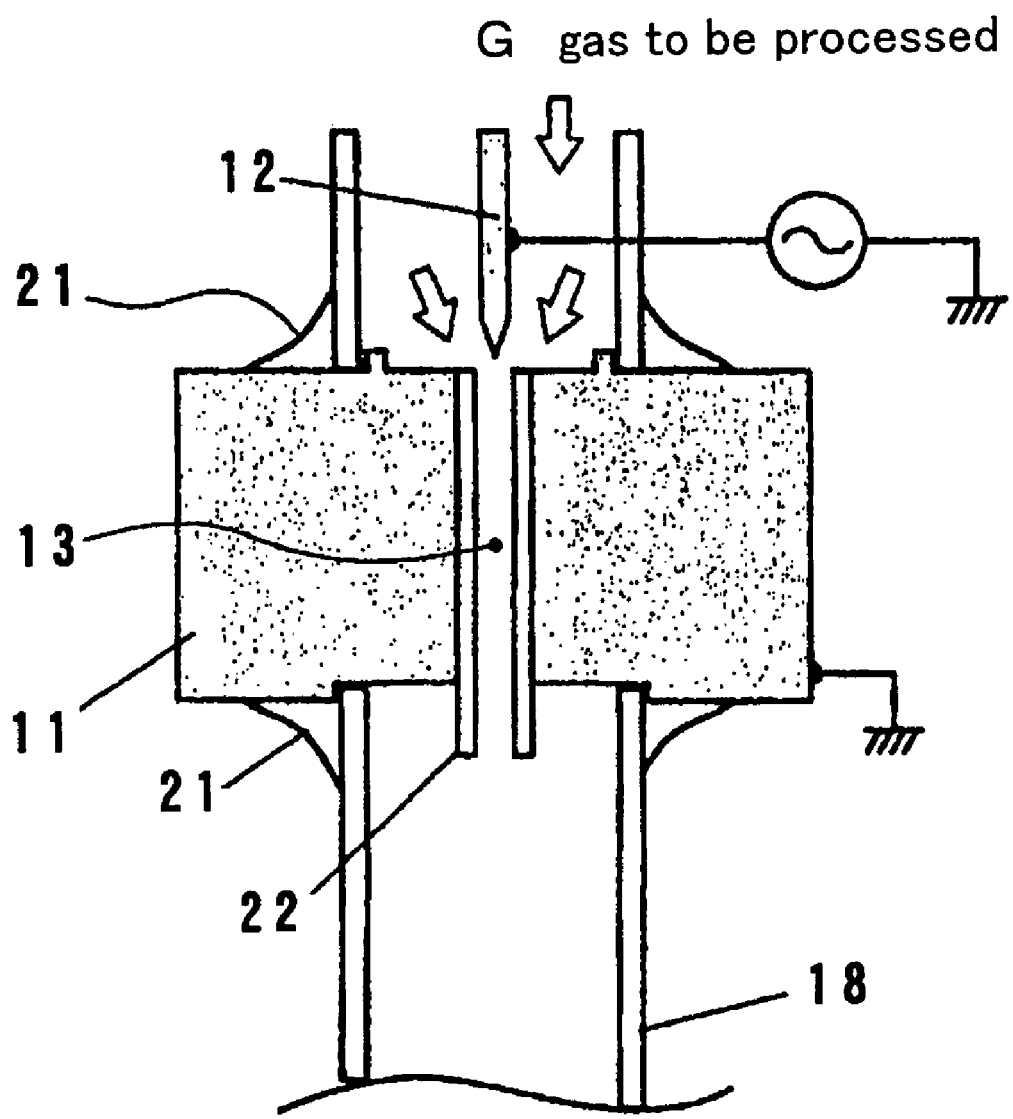
FIG. 5 is a sectional view of an essential portion showing another embodiment of the processing apparatus for subject A.

Embodiment shown in FIG. 5

In this embodiment, an inner wall of the reaction passage 13 is provided with a protecting ceramic pipe 22. As shown in FIG. 5, an end of the ceramic pipe 22 on the side of the high voltage electrode 12 is flushed with an end of the ground electrode 11, and the other end of the ceramic pipe 22 on the flow-out side projects from the end of the ground electrode 11. A ceramic material used for the ceramic pipe 22 is not limited only if erosion of the ground electrode 11 can be prevented, but alumina and the like are preferable for preventing the erosion.

In this embodiment, since the metal ground electrode 11 does not come into contact directly with plasma, erosion of the ground electrode 11 can be prevented by reactive species generated when gas to be processed is decomposed by plasma. Therefore, the ceramic pipe 22 may be longer than the reaction passage 13 of the ground electrode 11.

Figure 6:
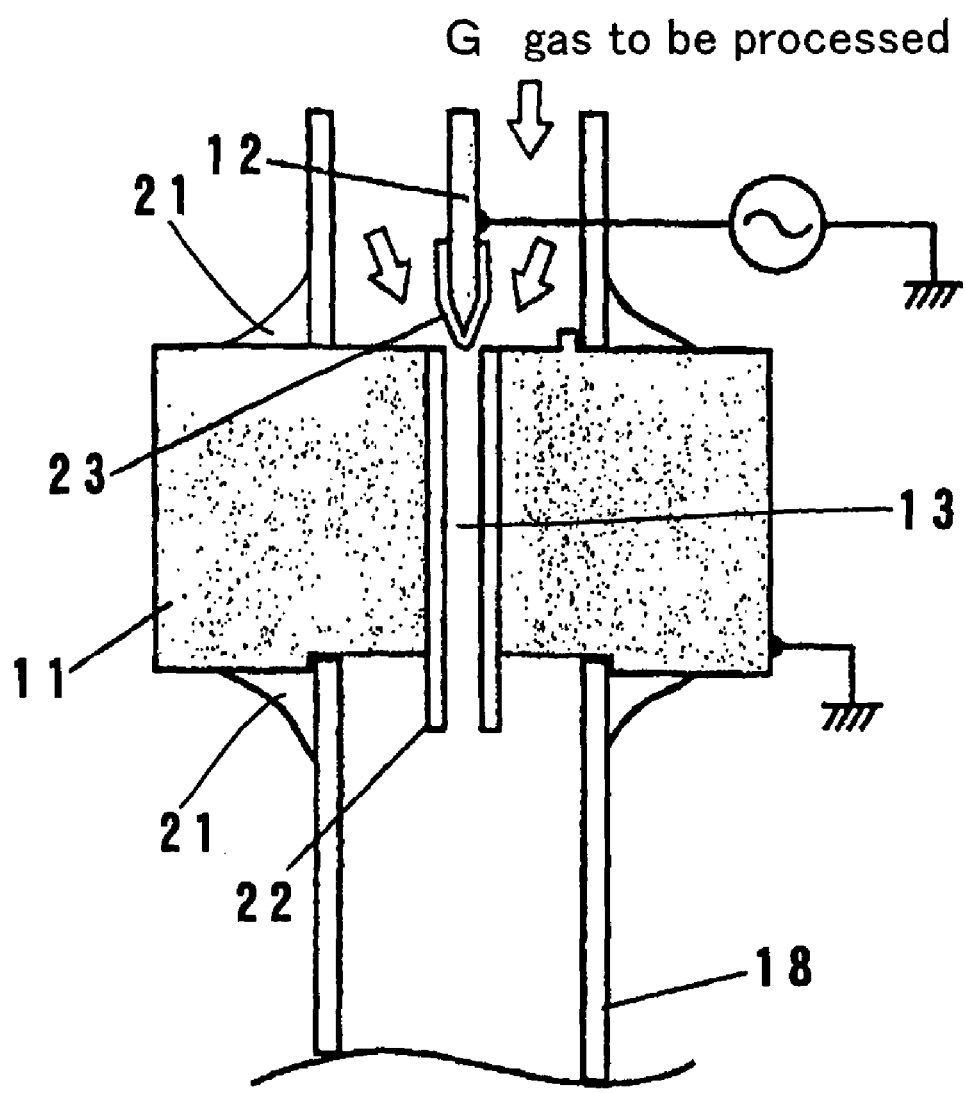
FIG. 6 is a sectional view of an essential portion showing another embodiment of the processing apparatus for subject A.

Embodiment shown in FIG. 6

In this embodiment, a tip end of the high voltage electrode 12 is covered with a ceramic coating 23.

By covering the tip end in this manner, the tip end of the high voltage electrode 12 is prevented from being worn, and the lifetime of the electrode can be elongated.

Figure 7:
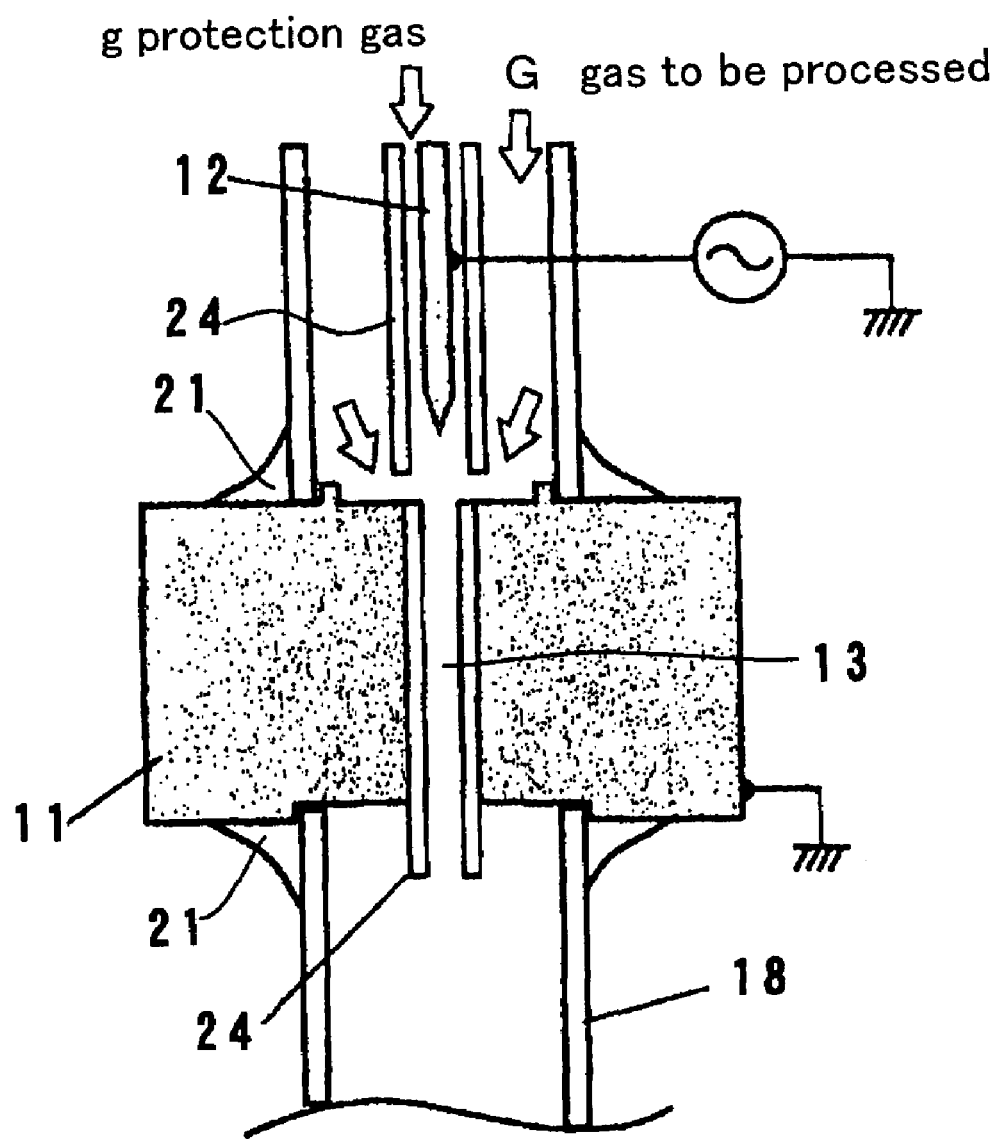
FIG. 7 is a sectional view of an essential portion showing another embodiment of the processing apparatus for subject A.

Embodiment shown in FIG. 7

In this embodiment, an outer periphery of the high voltage electrode 12 is provided with a cylindrical ceramic pipe 24, and protection gas g is allowed to flow between the high voltage electrode 12 and the ceramic pipe 24. A tip end of the high voltage electrode 12 is slightly recessed inward from a tip end of the surrounding ceramic pipe 24. Preferable examples of the protection gas g are nitrogen, argon, helium and the like.

According to this embodiment, plasma on the tip end of the high voltage electrode 12 is generated by ionization of the protection gas g, and reactive species generated by decomposition of to-be processed gas G does not reach the tip end of the electrode 12. Therefore, it is possible to prevent the erosion of the high voltage electrode 12 and its lifetime can be elongated.

Water vapor may be allowed to flow as protection gas g. In this case, the water vapor can protect the high voltage electrode 12.

Figure 8:
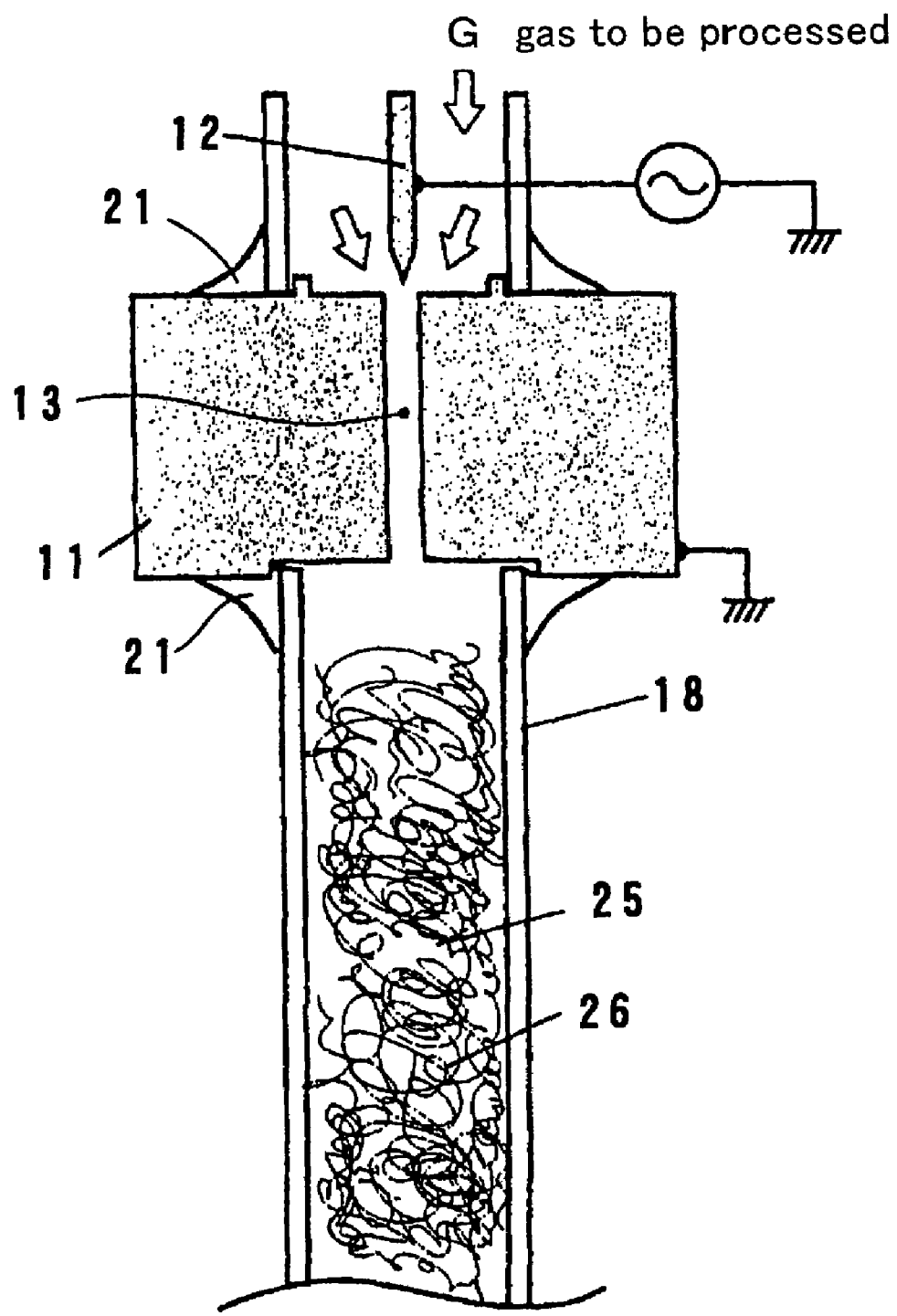
FIG. 8 is a sectional view of an essential portion showing another embodiment of the processing apparatus for subject A.

Embodiment shown in FIG. 8

In this embodiment, in any one of the embodiments shown in FIGS. 4 to 7, a mixture of wool-like buffering agent 25 and powder adsorbent 26 is disposed in the plasma chamber 18 in the vicinity of an outlet port of a reaction passage 13.

Preferable examples of the wool-like buffering agent 25 are glass wool, steel wool and the like, and preferable examples of the powder adsorbent 26 are calcium hydroxide and the like.

In this embodiment, by disposing the sorbent 26 in the immediately vicinity of plasma injecting from the reaction passage 13, reactive species decomposed and generated by plasma is efficiently reacted with sorbent 26 before its reactive force is not weakened, and decomposition can substantially be facilitated. Therefore, when the gas to be processed is $CF_4$, if calcium hydroxide is used as the sorbent 26, F atom generated by decomposing $CF_4$ is trapped as $CaF_2$, the decomposition can be facilitated.

In this embodiment, the structure shown in FIG. 8 may vertically be reversed, the high voltage electrode 12 may be disposed at a lower portion and the sorbent may be disposed at an upper portion, and the exhaust gas G may be allowed to flow from below to above. In this case, since the sorbent 26 is always located in the vicinity of the injecting port of plasma by gravity, effect for trapping the reactive species is improved.

Figure 9:
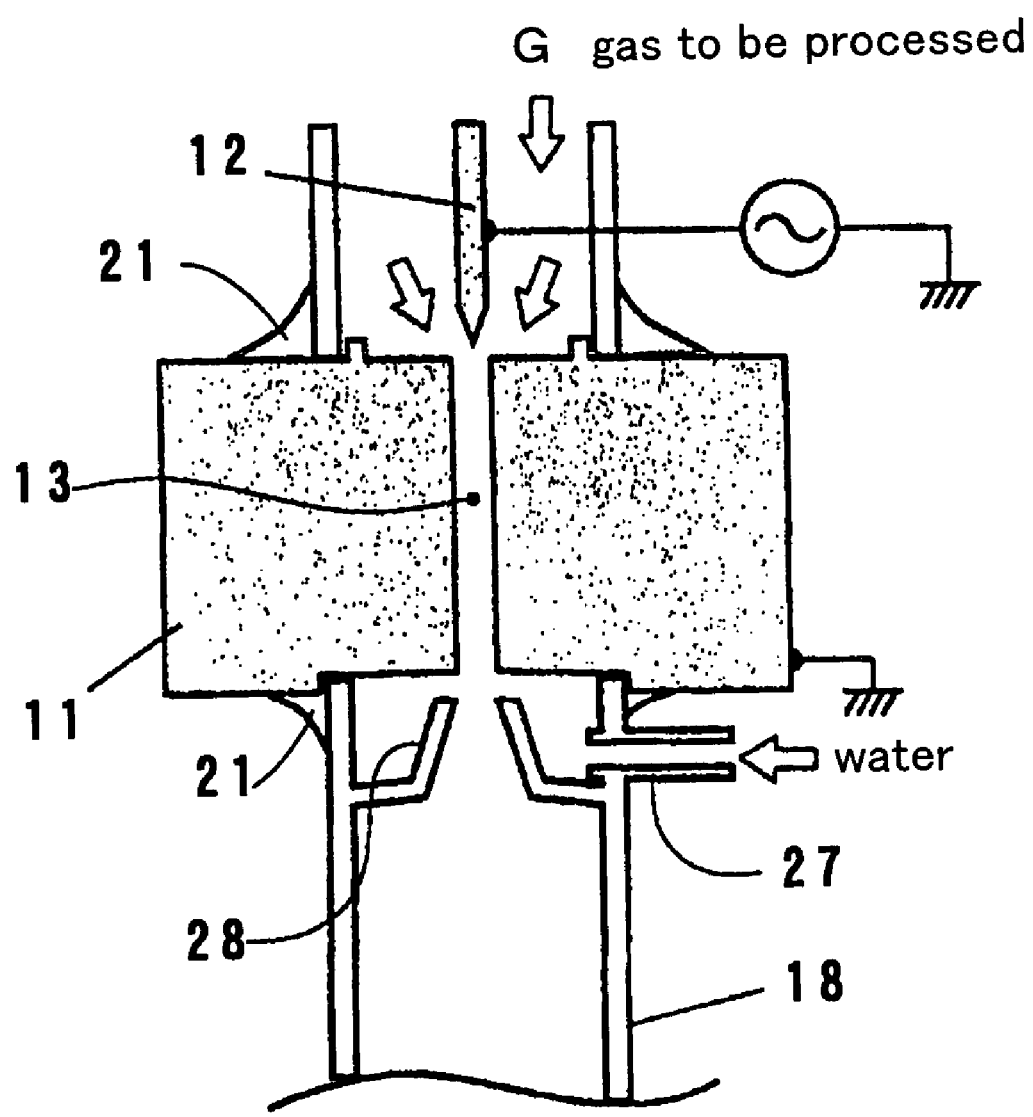
FIG. 9 is a sectional view of an essential portion showing another embodiment of the processing apparatus for subject A.

Embodiment shown in FIG. 9

In this embodiment, in any one of the embodiments shown in FIGS. 4 to 7, water is supplied inward from a periphery of the reaction passage at an outlet port of the reaction passage 13 of the ground electrode 11. Therefore, the plasma chamber 18 near the ground electrode 11 is provided with a supply passage 27 and a running water guide 28 which introduces water to the outlet port of the reaction passage 13.

In this embodiment, by supplying water in the immediately vicinity of plasma injecting from the reaction passage 13, reactive species decomposed and generated by plasma can be reacted with water, water-soluble reaction product can be swiftly discharged out from vapor phase, and decomposition can be substantially facilitated. When gas to be processed is $CF_4$, if the gas is reacted with water, $CF_4$ is decomposed to generate F atom, the F atom dissolves in water and trapped and thus, the decomposition can be facilitated.

Further, by continuously flowing water, absorbing effect of decomposition product can continuously be maintained. Alkaline material such as sodium hydroxide, potassium hydroxide, ammonia or the like may dissolve in water. In this case, when $CF_4$ is decomposed and F ion dissolves in water, the water becomes strongly acid in the as-is state, but the water is immediately neutralized, and there is a merit that erosion of a drain system can be suppressed.

A material (such as calcium hydroxide) having high reactivity with respect to a reactive product may be dissolved in water. In this case, when $CF_4$ is decomposed and F ion dissolves in water, there is a merit that the component can be precipitated and removed immediately.

In the embodiment shown in FIG. 9, water vapor may be introduced to the supply passage 27 and the running water guide 28.

In this embodiment, since an amount of heat of plasma is not absorbed by heating and evaporation of water, water and reactive species generated by decomposing to-be processed gas G are reacted with each other at vapor phase (in plasma) without lowering a temperature of plasma.

The gas is cooled in the downstream portion, the water vapor is liquefied, and water-soluble decomposition product may be removed together with water.

Figure 10:
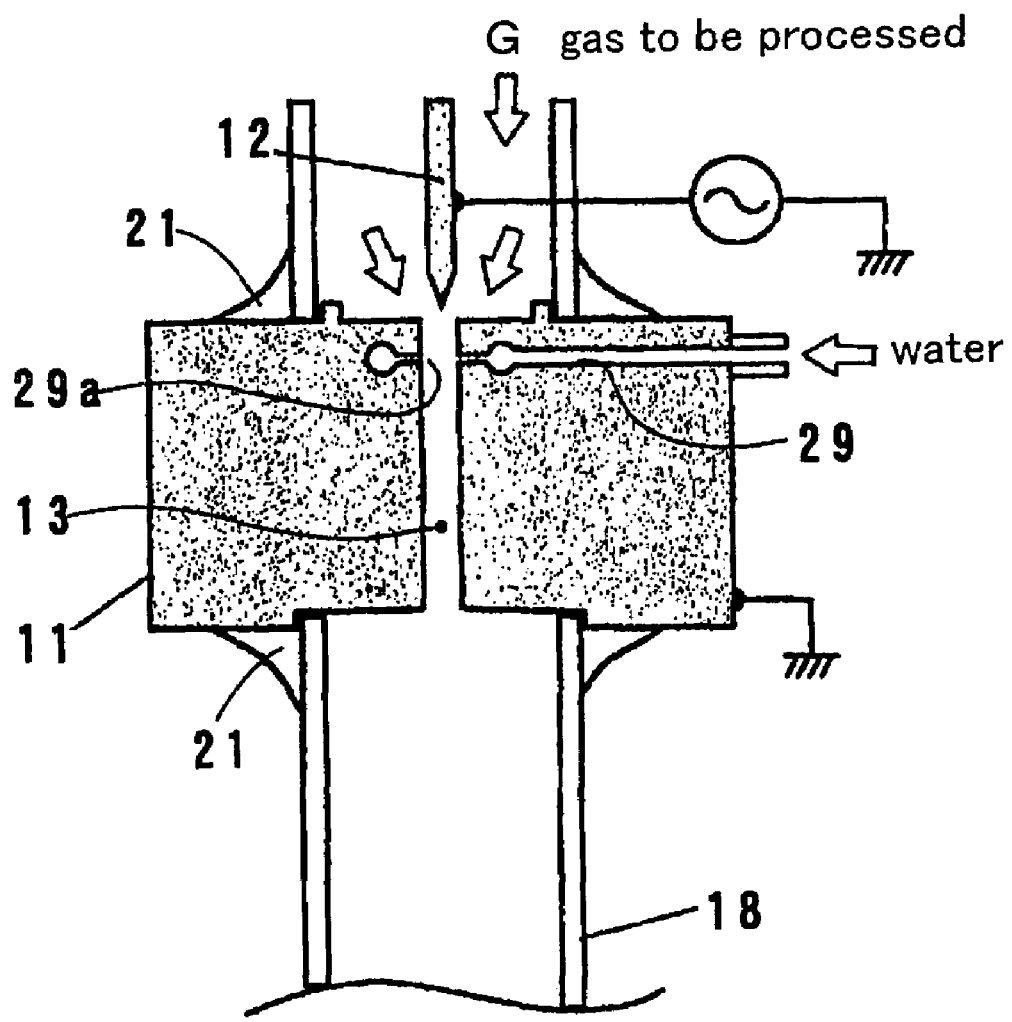
FIG. 10 is a sectional view of an essential portion showing another embodiment of the processing apparatus for subject A.

Embodiment shown in FIG. 10

In this embodiment, in any one of the embodiments shown in FIGS. 4 to 7, water is inwardly injected from a periphery of the reaction passage 13 at an inlet port of the reaction passage 13 of the ground electrode 11 or at an intermediate portion of the reaction passage 13. For this purpose, a water supply passage 29 which passes through the ground electrode 11 for guiding water into the reaction passage 13 is formed.

In this embodiment, since an amount of heat of plasma is not absorbed by heating and evaporation of water, water and reactive species generated by decomposing to-be processed gas G can be reacted with each other at vapor phase (in plasma) without lowering a temperature of plasma, and decomposition can be facilitated. In this embodiment, as compared with the embodiment shown in FIG. 9, since a section where water and plasma act on each other is long, the reaction is further facilitated.

In this embodiment, although a portion of drained water is evaporated by heat of plasma, most of water stays in its as-is state, and is poured along an inner wall of the reaction passage, and a discharging amount of water may be controlled such that a surface of the water becomes the ground side electrode. In this case, since the inner wall of the reaction passage is covered with always newly supplied water, there is effect that erosion of reaction passage inner wall by reactive species is prevented.

In this embodiment, it is preferable that a plurality of discharge ports 29a of water or water vapor are provided in intermediate portions of the reaction passage 13 in its circumferential direction. The plurality of discharge ports 29a of water or water vapor may be provided in the vertical direction. With this design, there is effect that mixing of water and plasma is more facilitated, and reaction between water and to-be processed gas G is more activated.

In the embodiment shown in FIG. 10, water vapor may be introduced into the water supply passage 29.

In this embodiment, as compared with a case in which water is introduced, an amount of heat of plasma is not absorbed by heating and evaporation of water, water and reactive species generated by decomposing to-be processed gas can be reacted with each other at vapor phase (in plasma) without lowering a temperature of plasma. The gas is cooled in the downstream portion, the water vapor is liquefied, and water-soluble decomposition product may be removed together with water.

In this embodiment, it is preferable that a plurality of discharge ports 29a of water or water vapor are provided in intermediate portions of the reaction passage 13 in its circumferential direction. The plurality of discharge ports 29a may be provided in the vertical direction. With this design, mixing between water vapor and plasma is further facilitated, there is effect that the reaction between water and to-be processed gas G is more activated.

In this embodiment, a pipe having an outer diameter which is smaller than an inner diameter of the reaction passage 13 may be inserted into a side surface of the reaction passage 13, a surface of a sidewall of this pipe downstream in the flowing direction of the to-be processed gas may be provided with a discharge port of water or water vapor. With this design, an initial velocity of water or water vapor when it is discharged can be directed substantially in parallel to a flow of the to-be processed gas, and there is effect that to-be processed gas G flows easily.

Figure 11:
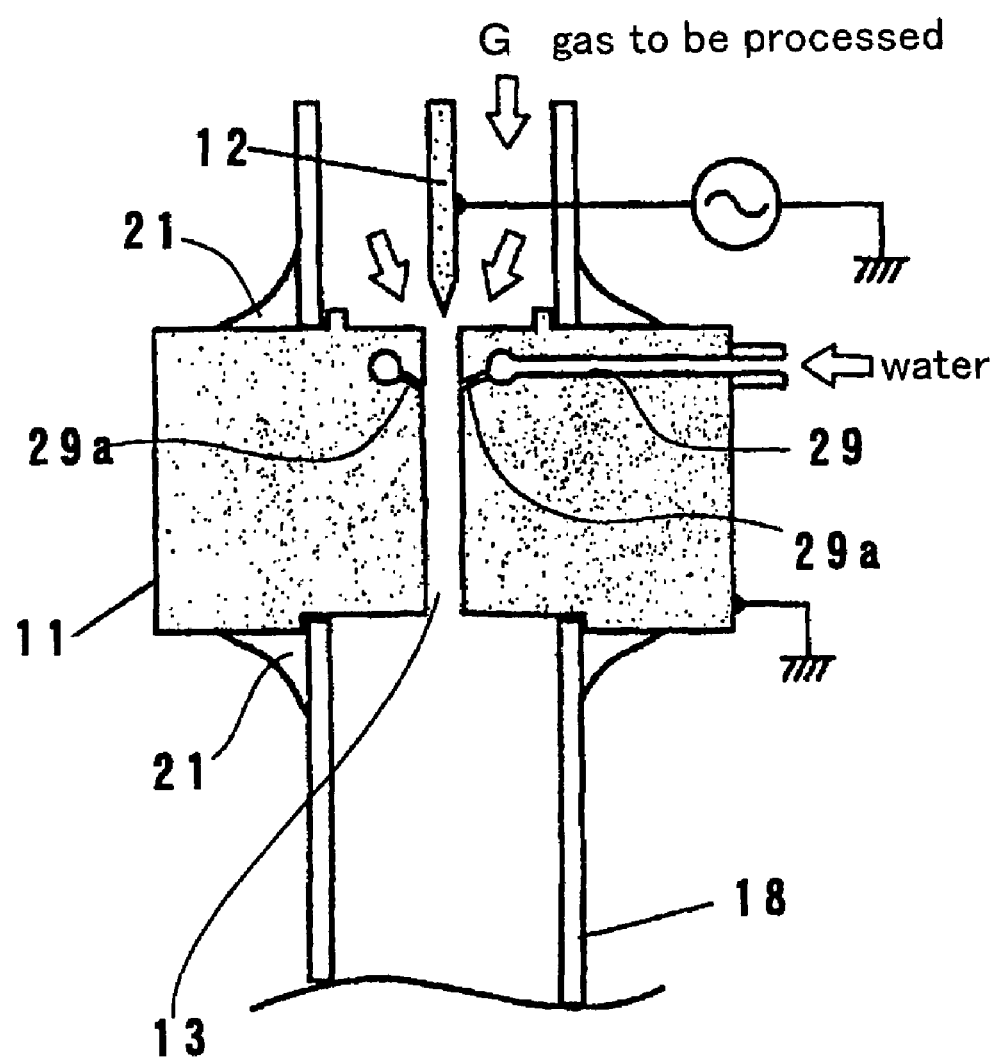
FIG. 11 is a sectional view of an essential portion showing another embodiment of the processing apparatus for subject A.

Embodiment shown in FIG. 11

This embodiment is based on the embodiment shown in FIG. 10, the discharge port 29a formed on a tip end of the water supply passage 29 for water or water vapor is directed diagonally downward, an initial velocity component having the same direction as that of the flow of to-be processed gas G is applied to water or water vapor, and the water or water vapor is discharged.

As compared with the embodiment shown in FIG. 10, the embodiment shown in FIG. 11 has effect that to-be processed gas G in the reaction passage 13 flows easily.

When the inner wall of the reaction passage 13 is provided with a ceramic pipe (see a symbol 22 in FIG. 6), it is preferable that the ceramic pipe is provided with the above-described discharge port 29a.

In this embodiment, it is preferable that a plurality of discharge ports 29a of water or water vapor are provided in intermediate portions of the reaction passage 13 in its circumferential direction. The plurality of discharge ports 29a may be provided in the vertical direction. With this design, mixing between water or water vapor and plasma is further facilitated, and there is effect that the reaction between water and to-be processed gas G is more activated.

In this embodiment, a pipe having an outer diameter which is smaller than an inner diameter of the reaction passage 13 may be inserted into a side surface of the reaction passage 13, a surface of a sidewall of this pipe downstream in the flowing direction of the to-be processed gas may be provided with a discharge port of water or water vapor. With this design, an initial velocity of water or water vapor when it is discharged can be directed substantially in parallel to a flow of the to-be processed gas, and there is effect that to-be processed gas G flows easily.

Figure 12:
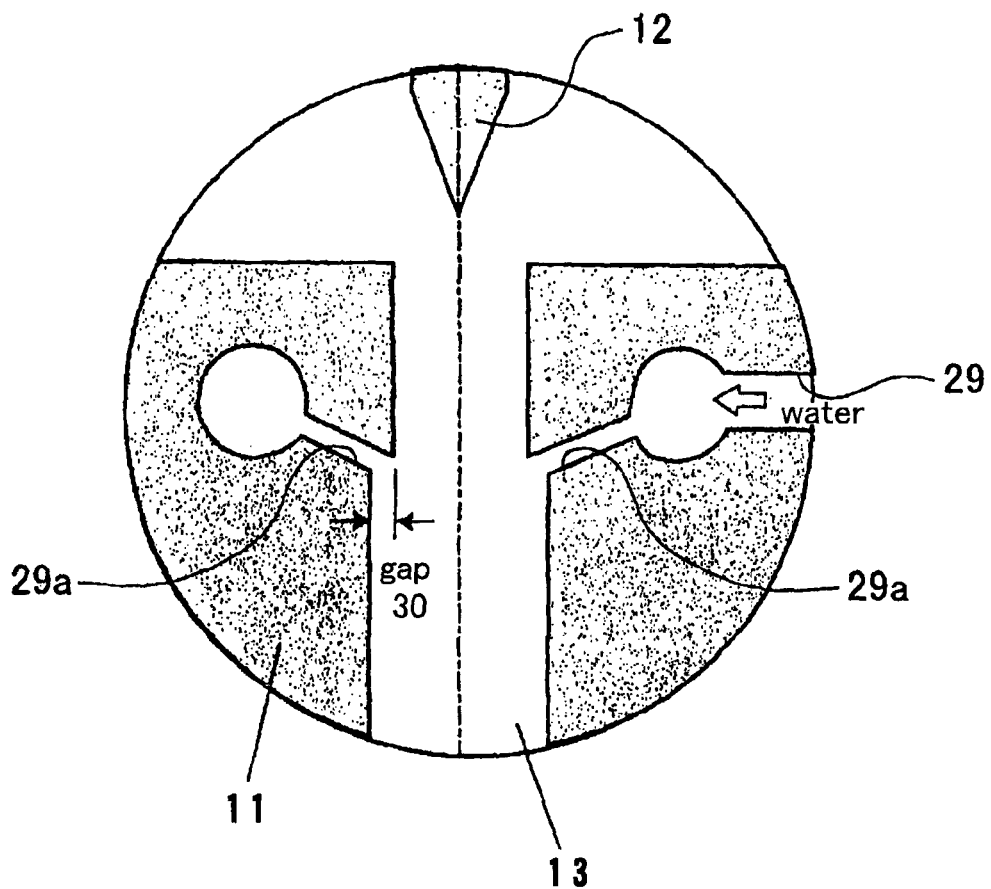
FIG. 12 is a sectional view of an essential portion showing another embodiment of the processing apparatus for subject A.

Embodiment shown in FIG. 12

This embodiment is based on the embodiment shown in FIG. 11. A gap 30 is provided between an upper edge and a lower edge of the discharge port 29a of the water or water vapor.

With this design, an initial velocity of water or water vapor in the same direction as the flowing direction of the to-be processed gas G when the water or water vapor is discharged can increased, and there is effect that to-be processed gas G flows easily.

In this embodiment, it is preferable that a plurality of discharge ports 29a of water or water vapor are provided in intermediate portions of the reaction passage 13 in its circumferential direction. The plurality of discharge ports 29a may be provided in the vertical direction. With this design, mixing between water or water vapor and plasma is further facilitated, and there is effect that the reaction between water and to-be processed gas G is more activated.

Figure 13:
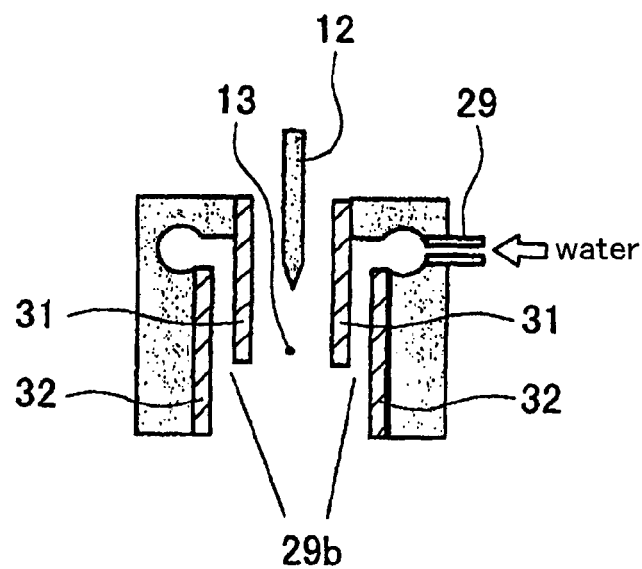
FIG. 13 is a sectional view of an essential portion showing another embodiment of the processing apparatus for subject A.

Embodiment shown in FIG. 13

In this embodiment, a discharge port of water or water vapor is formed by gaps of two kinds of pipes having different diameters. Therefore, a pipe 31 having a small diameter and a pipe 32 having a large diameter are concentrically disposed around an inner periphery of the reaction passage 13 of the ground electrode 11, an upper portion of the gap between both the pipes 31 and 32 is in communication with the water supply passage 29, and a lower portion of the gap is a discharge port 29b.

In this embodiment, an initial velocity of water or water vapor when it is discharged can be directed substantially in parallel to a flow of the to-be processed gas G, and there is effect that to-be processed gas G flows easily.

Figure 14:
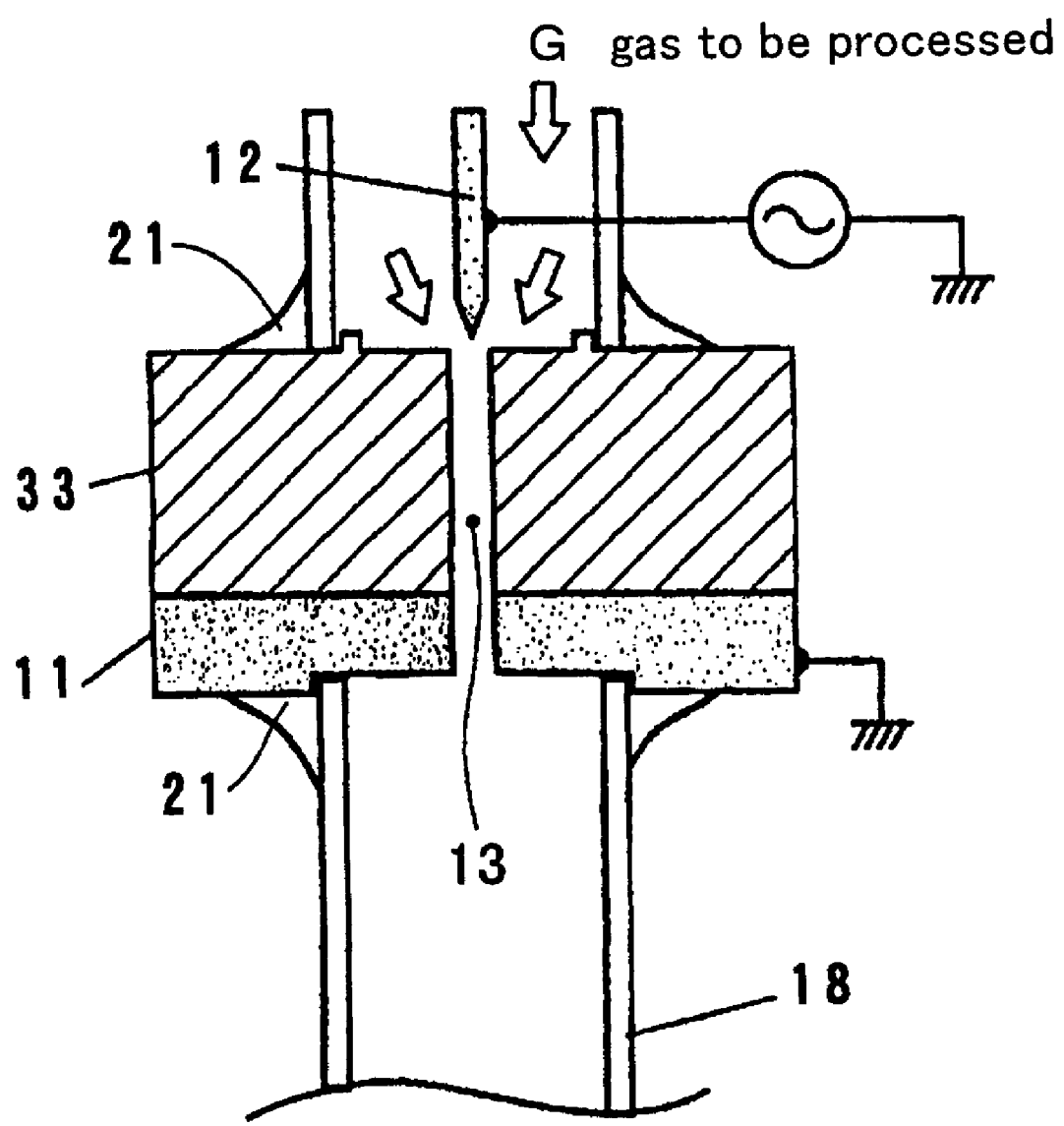
FIG. 14 is a sectional view of an essential portion showing another embodiment of the processing apparatus for subject A.

Embodiment shown in FIG. 14

In this embodiment, an insulating material 33 is laminated on an upper surface of the ground electrode 11, and the ground electrode 11 and the insulating material 33 form a thin and long reaction passage 13. That is, the insulating material 33 is provided on an upper portion of the reaction passage 13, and the ground electrode 11 is disposed on the flow-out side of the reaction passage 13.

With this design, even when the amount of flow of the to-be processed gas G is small, it is possible to fill the reaction passage 13 with plasma.

Figure 15:
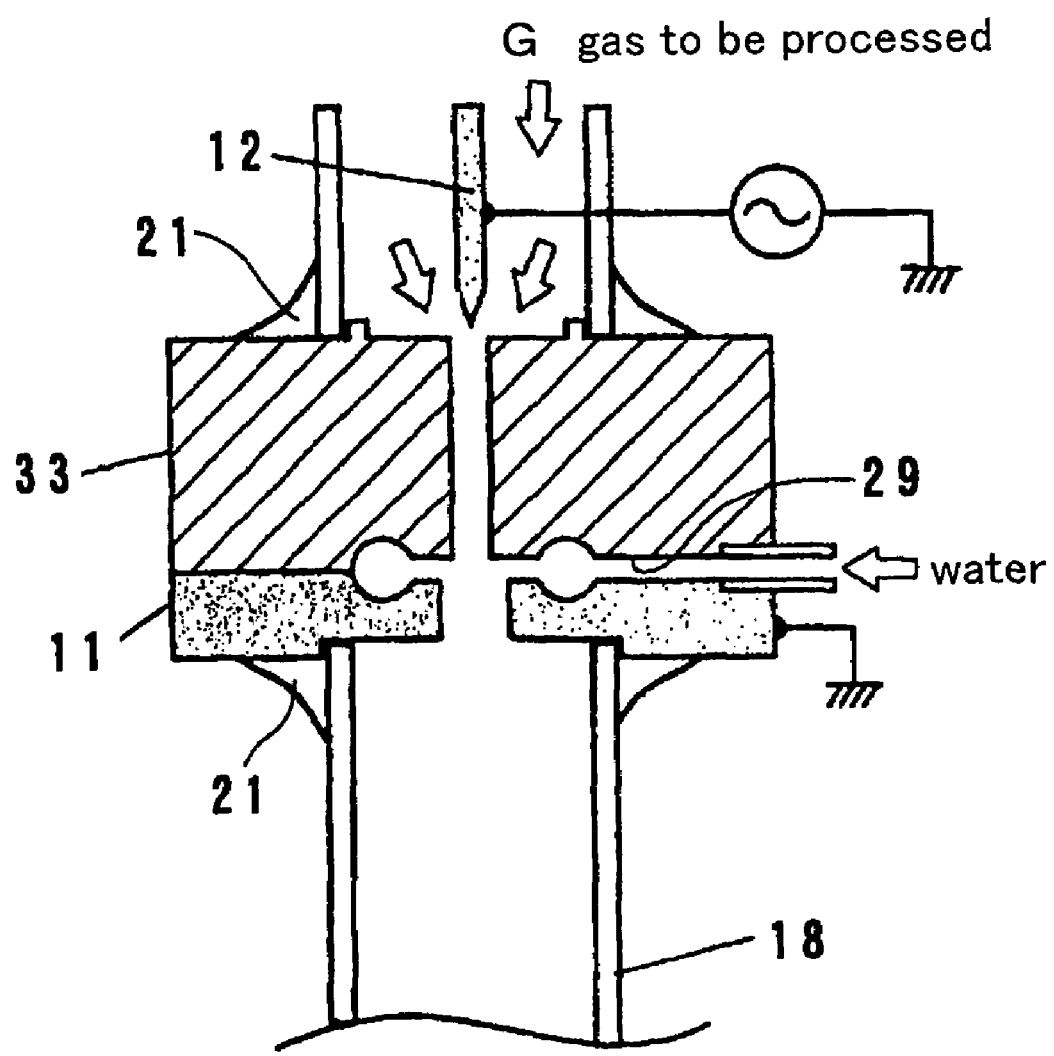
FIG. 15 is a sectional view of an essential portion showing another embodiment of the processing apparatus for subject A.

Embodiment shown in FIG. 15

In this embodiment, water is injected from between the insulating material 33 and the ground electrode 11. Therefore, the water supply passage 29 is formed between the insulating material 33 and the ground electrode 11.

This embodiment has the same effect as that of the embodiment shown in FIG. 14, and the reliability of protection of the ground electrode 11 by water is enhanced.

Figure 16:
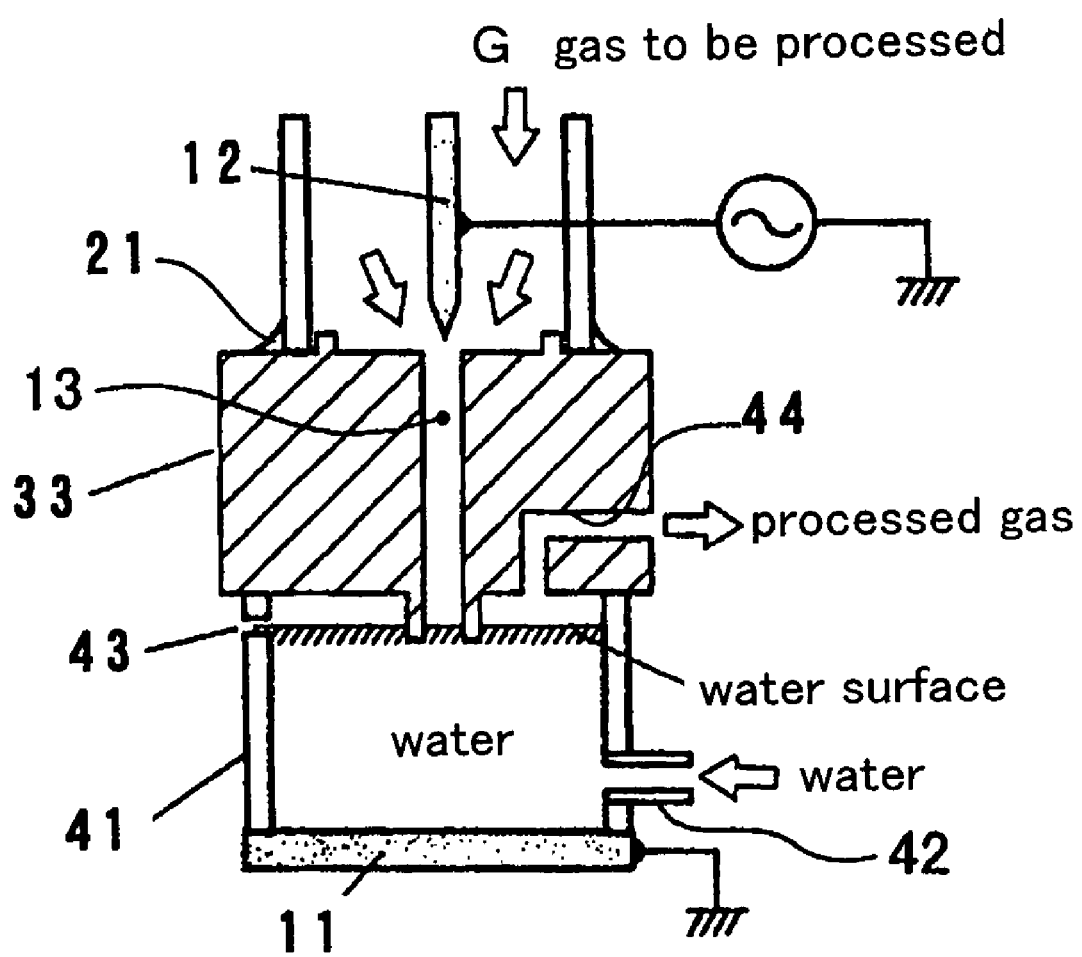
FIG. 16 is a sectional view of an essential portion showing another embodiment of the processing apparatus for subject A.

Embodiment shown in FIG. 16

As shown in FIG. 16, the high voltage electrode 12 and the ground electrode 11 are disposed such as to be opposed to each other, and the water reservoir 41 and the insulating material 33 are disposed on an upper surface of the ground electrode 11 in this order. The insulating material 33 is formed at its central portion with the thin and long reaction passage 13, and the high voltage electrode 12 is located above the central portion. Water is supplied into the water reservoir 41, and the ground electrode 11 is disposed on the bottom of the water reservoir 41. An outlet of the reaction passage 13 projects under a water surface in the water reservoir 41 so that the to-be processed gas G becomes bubbles and passes through water. A water supply pipe 42 is connected to the water reservoir 41, and the water reservoir 41 is provided at its upper portion with a water level adjusting hole 43. If water is always supplied from the water supply pipe 42 and is discharged from the water level adjusting hole 43, it is possible to always reserve new water while constantly maintaining the water level. An exhaust port 44 is formed from a lower surface to a side surface of the insulating material 33 so that processed exhaust gas G can be exhausted to atmosphere while passing through water.

In this embodiment, water in the water reservoir 41 is in communication with the ground electrode 11 and as a result, the water constitutes a liquid electrode. Therefore, if high voltage or high frequency voltage is applied to the high voltage electrode 12, plasma is generated in the reaction passage 13 between the high voltage electrode 12 and the water surface. While the to-be processed gas G passes through the plasma region, the gas G is decomposed and passes through water, and again exits from the water and is exhausted out from the exhaust hole 44 formed in an upper portion of the water reservoir 41. Soluble component among the components decomposed during this time is trapped in water, and non-soluble component is discharged into atmosphere. Water in the water reservoir 41 may be or may not be circulated, but if new water is always supplied and old water is drained, it is possible to continuously discharge the decomposed gas components together with water. The processed gas may be exhausted from the water level adjusting hole 43 together with water.

In a plasma system to which the present invention is applied, gas such as PFC and $CF_4$ is used. The exhaust gas of $CF_4$ is diluted with $N_2$ when it is exhausted, and is impurified by $O_2$ generated in an etching step of $SiO_2$ in some cases. Therefore, the exhaust gas includes water-soluble NOx such as $NO_2$ and $NO_3$. The processing apparatus for subject A of the present embodiment uses a water electrode. Therefore, electrical discharge product after decomposition is not exhausted into atmosphere, and the product can immediately dissolves in water, and it is possible to flow out the product together with water.

Next, decomposition rate of the processing apparatus for subject A of the present embodiment will be explained. Gas exhausted from the process chamber is decomposed to F or C by decomposing effect by plasma. That is, when the gas passes through the plasma region, $CF_4$ is decomposed into $CF_3$, $CF_2$, CF, C, an ion thereof and the like. According to an experiment using the processing apparatus for subject A of the present embodiment, an amount of F ion included in water after decomposing processing was analyzed and as a result, since substantially the same amount as that of F ion included in used $CF_4$ gas was detected, it was found that substantially 100% of $CF_4$ was decomposed.

Figure 17:
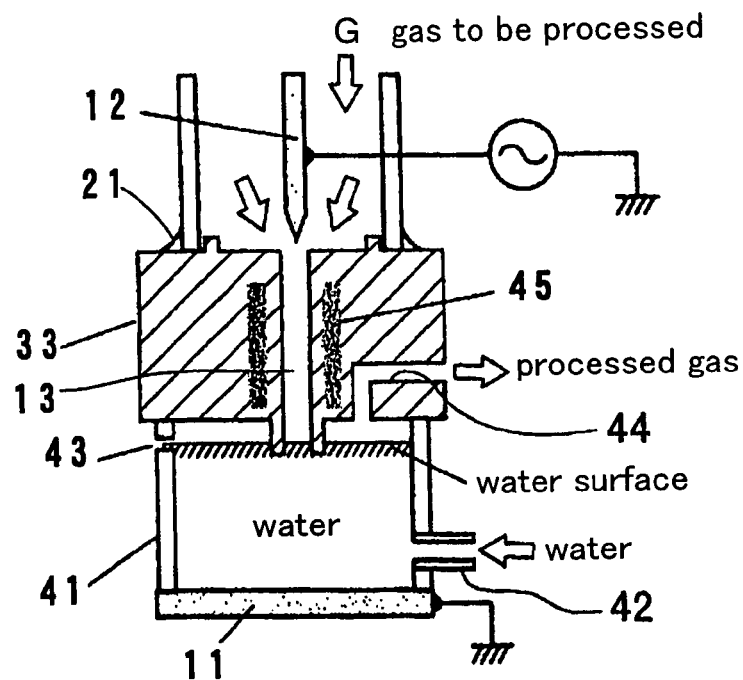
FIG. 17 is a sectional view of an essential portion showing another embodiment of the processing apparatus for subject A.

Embodiment shown in FIG. 17

In this embodiment, an inner wall of the reaction passage 13 provided in the insulating material 33 is heated to 100° C. or higher by a heater 45.

With this, a temperature of gas in a plasma region of the reaction passage 13 is increased, chemical reaction in plasma is facilitated, moisture mixed in the reaction passage 13 by diffusion of vapor or vibration of water surface attaches to the inner wall of the reaction passage 13 as a waterdrop, and disturbance can be prevented from being applied to electric discharge.

Figure 18:
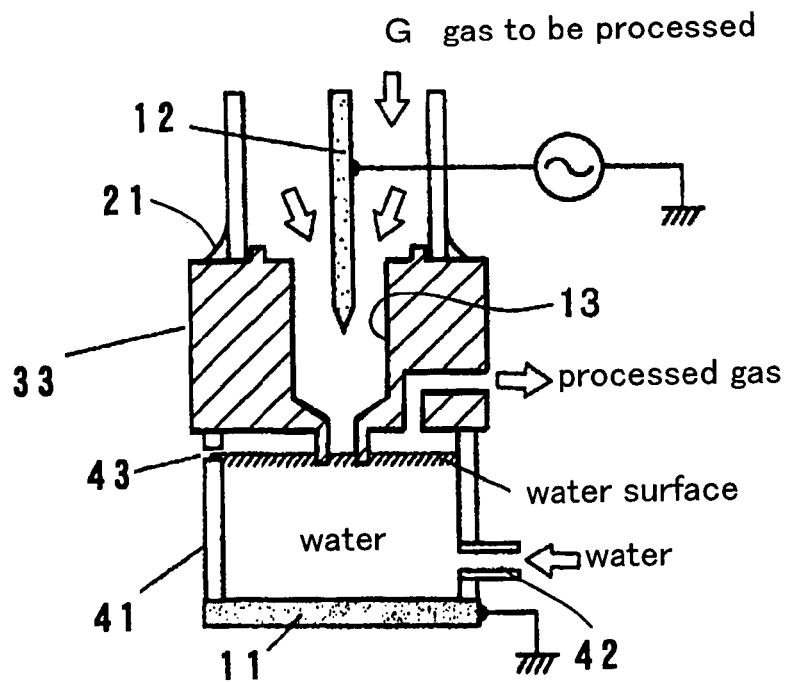
FIG. 18 is a sectional view of an essential portion showing another embodiment of the processing apparatus for subject A.

Embodiment shown in FIG. 18

This embodiment is based on the embodiment shown in FIG. 16, and an inner diameter of the reaction passage 13 upstream from its exit is increased. That is, only a portion of the reaction passage 13 in the vicinity of its exit has thin and narrowed cross section. Even with such a shape, the reaction passage 13 is filled with plasma and thus, exhaust gas can be decomposed.

According to this embodiment, disturbance applied to electrical discharge by a waterdrop which is attached to the inner wall of the reaction passage 13 can be minimized.

Figure 19:
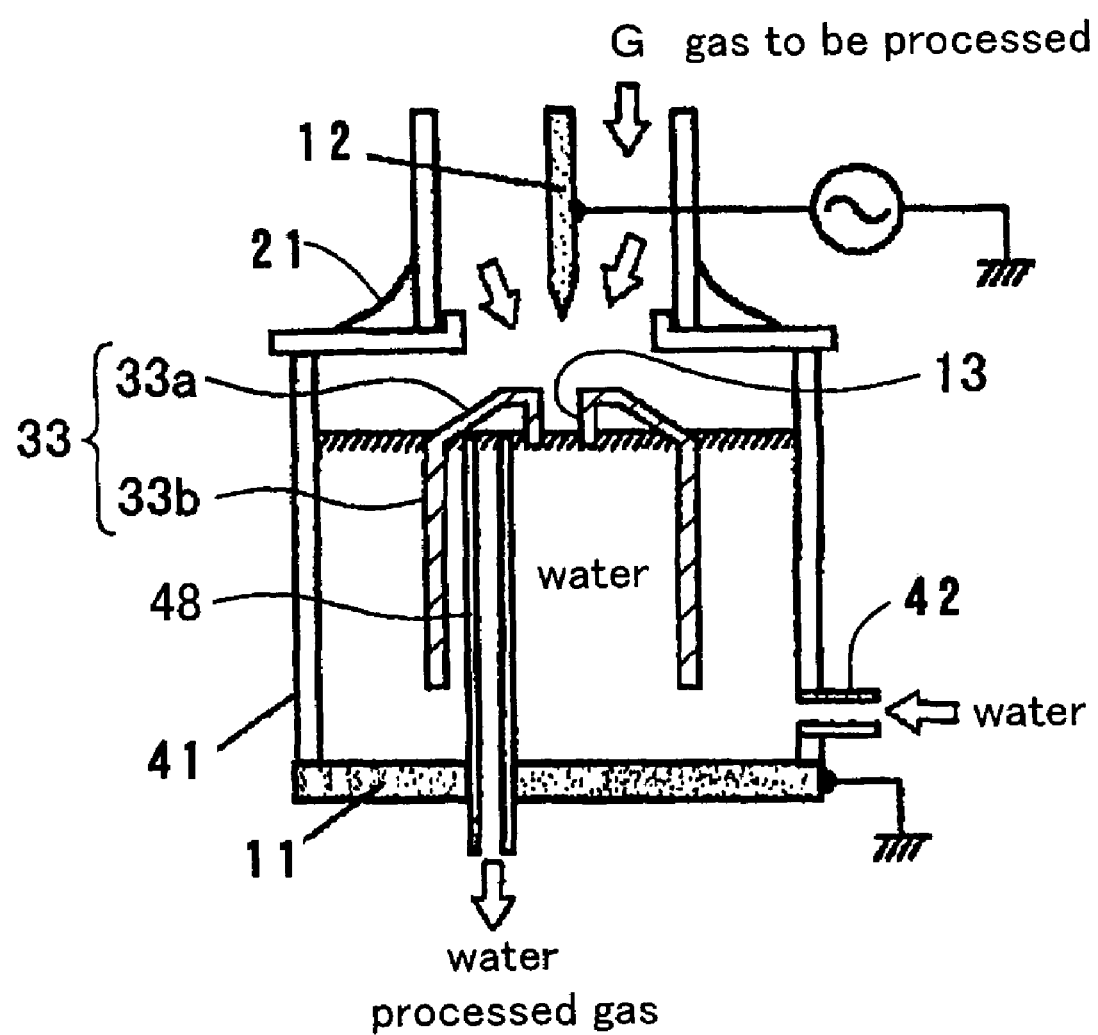
FIG. 19 is a sectional view of an essential portion showing another embodiment of the processing apparatus for subject A.

Embodiment shown in FIG. 19

This embodiment is based on the embodiment shown in FIG. 18. Portions of the insulating material 33 for restricting the reaction passage 13 except its portion which is in water and a trapping and exhausting portion of processed gas are removed, and a container wall of the water reservoir 41 are used as the reaction passage. Therefore, the insulating material 33 comprises a truncated conical cylindrical upper end 33a and a cylindrical lower end 33b, and a center opening of the upper end 33a serves as the reaction passage 13. The insulating material 33 is supported in the water reservoir 41. A water level adjusting pipe 48 is inserted into the water reservoir 41 such that the pipe 48 stands up therein, and an upper end of the pipe 48 is located in the upper end 33a of the insulating material 33. Therefore, the water level in the water reservoir 41 is maintained such that an outer periphery of the upper end 33a of the insulating material 33 comes into water. That is, the flow-out side end of the reaction passage 13 is located in water. The high voltage electrode 12 is located on the flow-in side of the reaction passage 13.

According to this embodiment, water evaporated from the water surface of the electrical discharge portion can be returned from outside of the upper end 33a into the water reservoir 41, and water is not attached to the inner wall of the reaction passage 13. Therefore, disturbance applied to electrical discharge by a waterdrop can be minimized.

If the water level adjusting hole is constituted by the pipe 48 inserted from a bottom of the water reservoir 41 as in this embodiment, it is possible to freely change a set water level by length of the inserted pipe 48. This pipe 48 may be replaced by the water level adjusting hole 43 in the embodiments shown in FIGS. 16 to 18.

Figure 20:
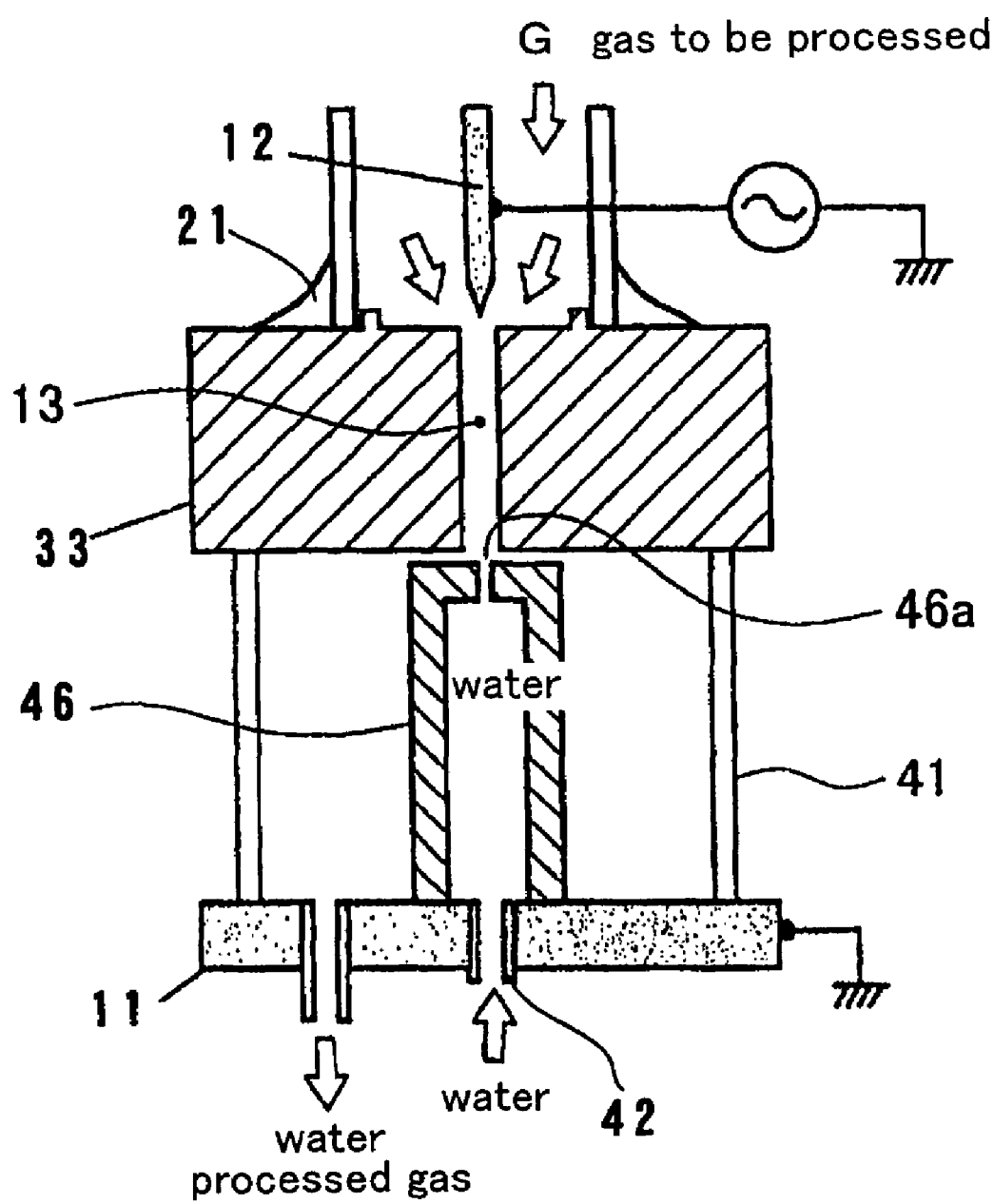
FIG. 20 is a sectional view of an essential portion showing another embodiment of the processing apparatus for subject A.

Embodiment shown in FIG. 20

In this embodiment, the thin and long reaction passage 13 is formed in a center of the insulating material 33 located below the high voltage electrode 12, an insulative bottomed cylindrical body 46 is disposed in the water reservoir 41 disposed between the insulating material 33 and the ground electrode 11. A bottom of the cylindrical body 46 is opened so that water is supplied to the cylindrical body 46, and a top of the cylindrical body 46 is provided at its central portion with a fine hole 46a. Water supplied to the cylindrical body 46 passes through the upper end fine hole 46a and is drained toward an exit of the reaction passage 13, and the water works as a water electrode. The waterdrops along an outer surface of the cylindrical body 46, and enters into the water reservoir 41, and is discharged from a water channel provided with the ground electrode 11 in its bottom.

With this embodiment, new water is always supplied to a portion where the reaction with water is most active and where plasma and water come into contact with each other, and there is effect that the reaction is facilitated.

Figure 21:
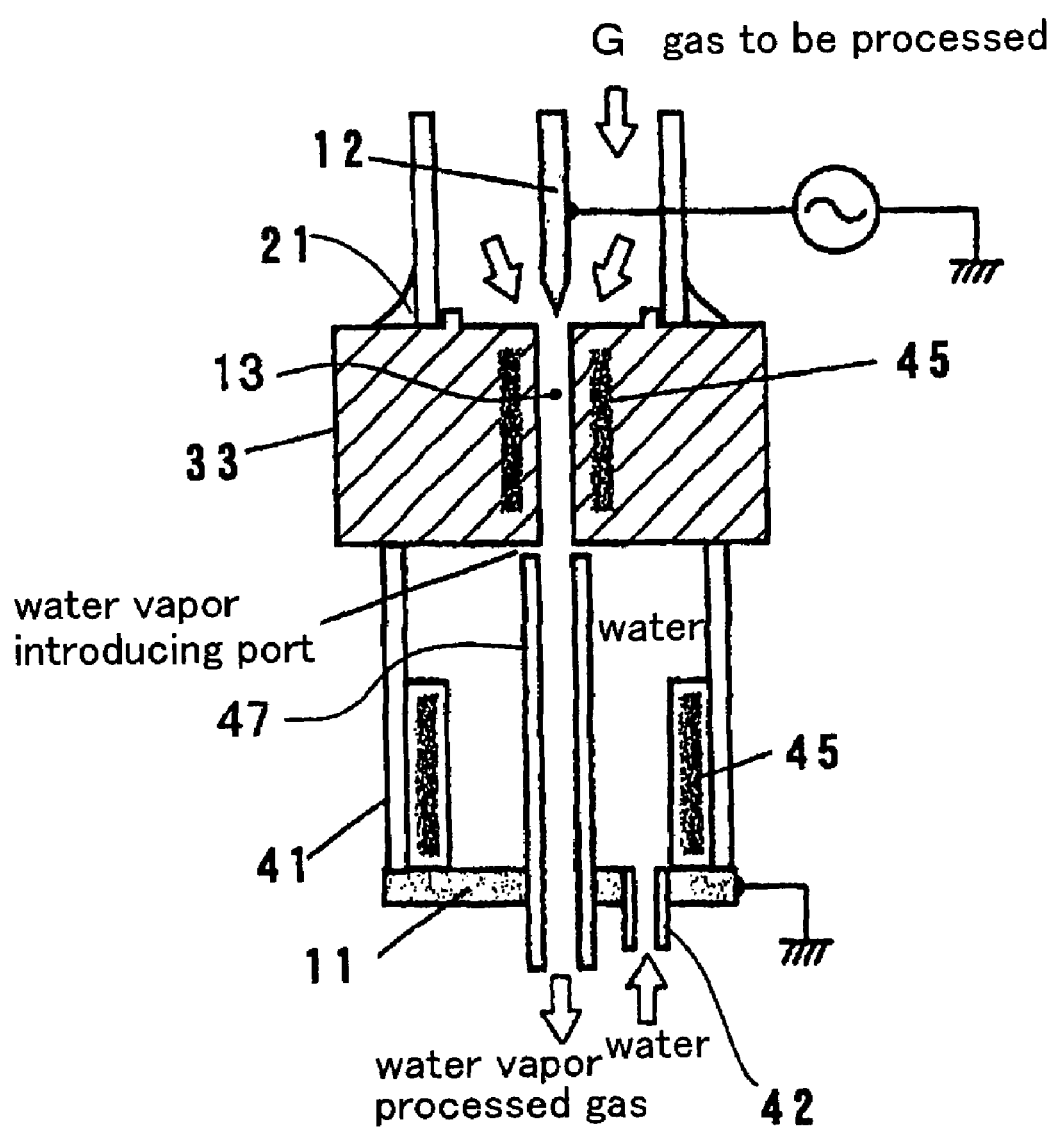
FIG. 21 is a sectional view of an essential portion showing another embodiment of the processing apparatus for subject A.

Embodiment shown in FIG. 21

In this embodiment, a heater 45 is provided in the insulating material 33, and another heater 45 is also provided in the water reservoir 41. The ground electrode 11 provided on a bottom of the water reservoir 41 is provided with a water supply port, and an exhaust pipe 47 stands up in the water reservoir 41. An upper end of the exhaust pipe 47 is located in the vicinity of the flow-out side of the reaction passage 13, and a lower end of the exhaust pipe 47 passes through the ground electrode 11.

In this embodiment, water in the water reservoir 41 works as a ground side electrode of the electrical discharge, the water in the water reservoir 41 is heated and evaporated by the heater 45, and is introduced into the electrical discharge space of the reaction passage 13 from its lower end as the water vapor.

This embodiment has the same effect as the water vapor in the embodiments shown in FIGS. 9 and 10, and has the same feature as that of the embodiment shown in FIG. 18. Further, since the metal ground electrode 11 does not come into contact with plasma, there is effect that erosion is not generated in the ground electrode 11. Further, by heating the water in the water reservoir 41, the entire reaction passage 13 is maintained at a high temperature, and there is effect that the decomposition is facilitated.

Figure 22:
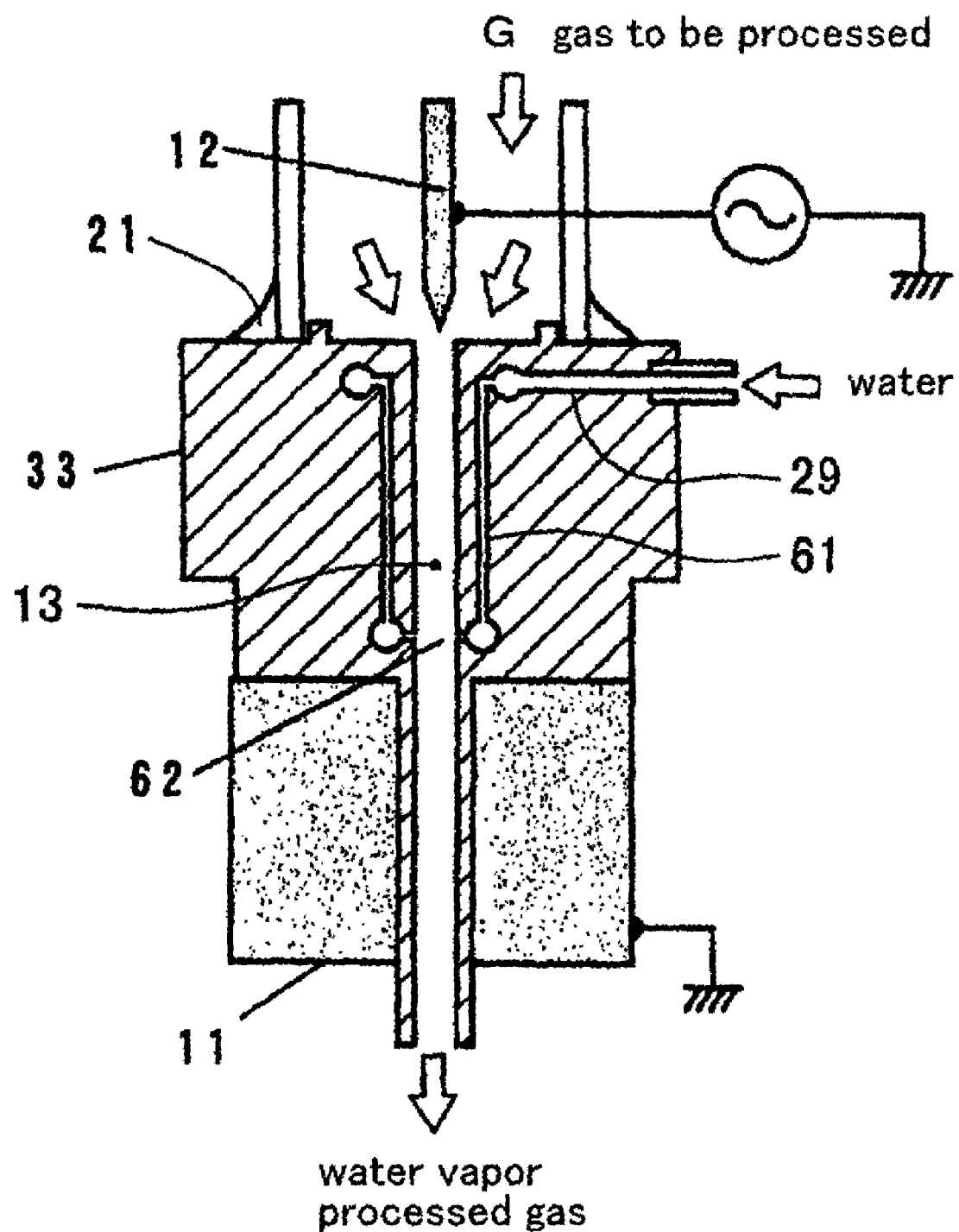
FIG. 22 is a sectional view of an essential portion showing another embodiment of the processing apparatus for subject A.

Embodiment shown in FIG. 22

In this embodiment, water is heated by heat which is generated by electrical discharge, and the water is allowed to be evaporated and introduced into the electrical discharge space as water vapor. For this purpose, a waterway 61 which extends along a gas-flowing direction is provided in an inner wall portion of the insulating material 33 in the vicinity of the reaction passage 13, the water supply passage 29 is connected to an upper end of the waterway 61 (closer to the high voltage electrode 12), a water vapor discharging hole 62 which is opened toward the reaction passage 13 is formed at a lower end of the waterway 61 (further from the high voltage electrode 12).

In this embodiment, since water is heated by plasma in the reaction passage 13 while the water passes through the waterway 61, there are merits that the same effect as that of the embodiment shown in FIG. 21 can be obtained, it is unnecessary to separately provide a heater for heating the water, and utilizing efficiency of power is enhanced.

Figure 23:
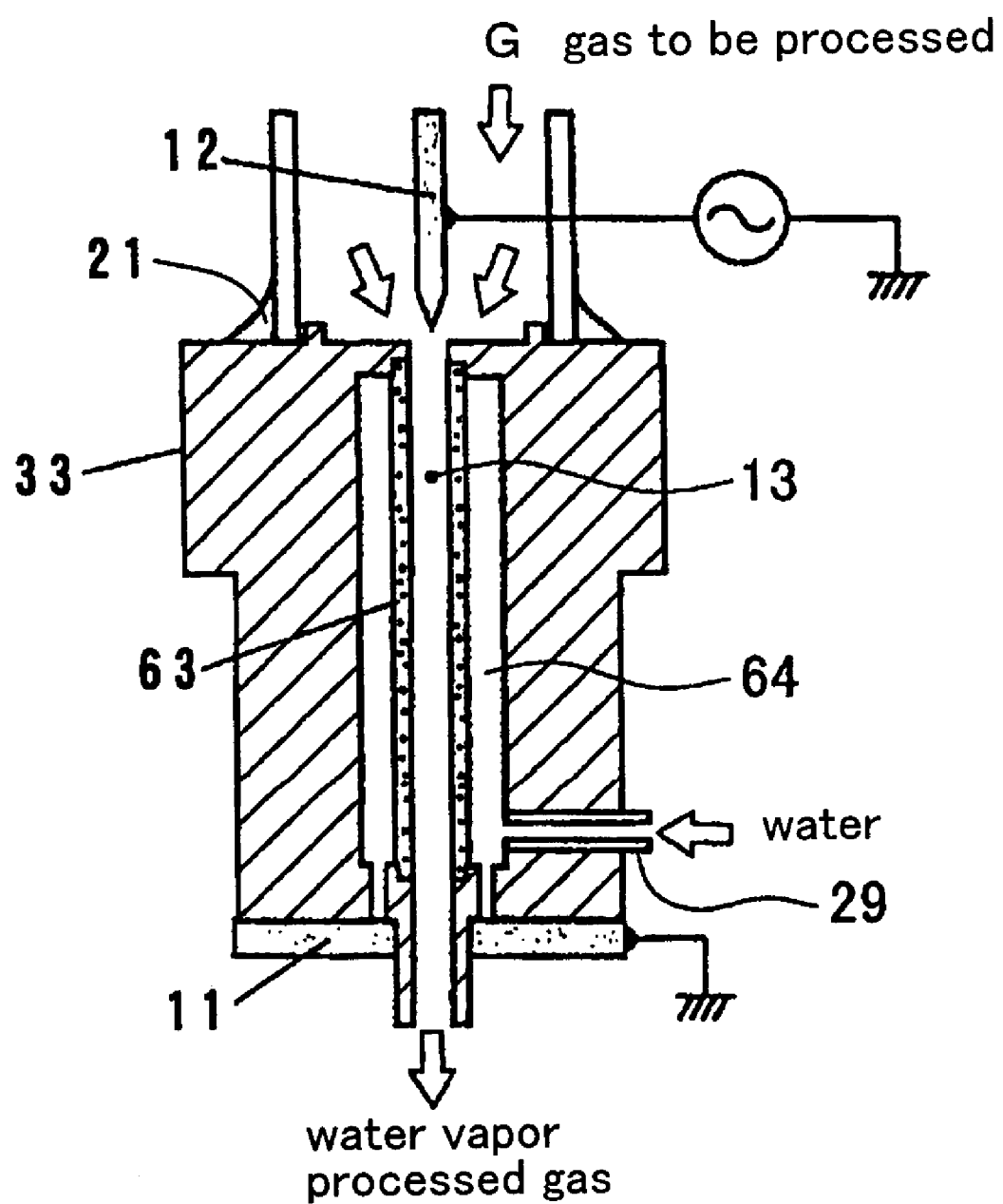
FIG. 23 is a sectional view of an essential portion showing another embodiment of the processing apparatus for subject A.

Embodiment shown in FIG. 23

In this embodiment, the inner wall of the reaction passage 13 comprises a porous ceramic pipe 63, and a waterway 64 is formed around the porous ceramic pipe 63. The waterway 64 is provided in the insulating material 33, water is supplied from the supply passage 29, and a portion of the water comes into contact with the ground electrode 11.

According to this embodiment, water is heated while it passes through the waterway 64, hot water or water vapor penetrates into an interior of the reaction passage 13 over its entire length from the porous ceramic pipe 63, and the hot water or water vapor can be introduced into the electrical discharge space.

With this design, water uniformly exudes from the entire surface of the inner wall of the reaction passage 13, reaction between plasma and water or water vapor is uniformly taken place over the entire reaction passage, and there is effect that the reaction is effectively carried out.

Figure 24:
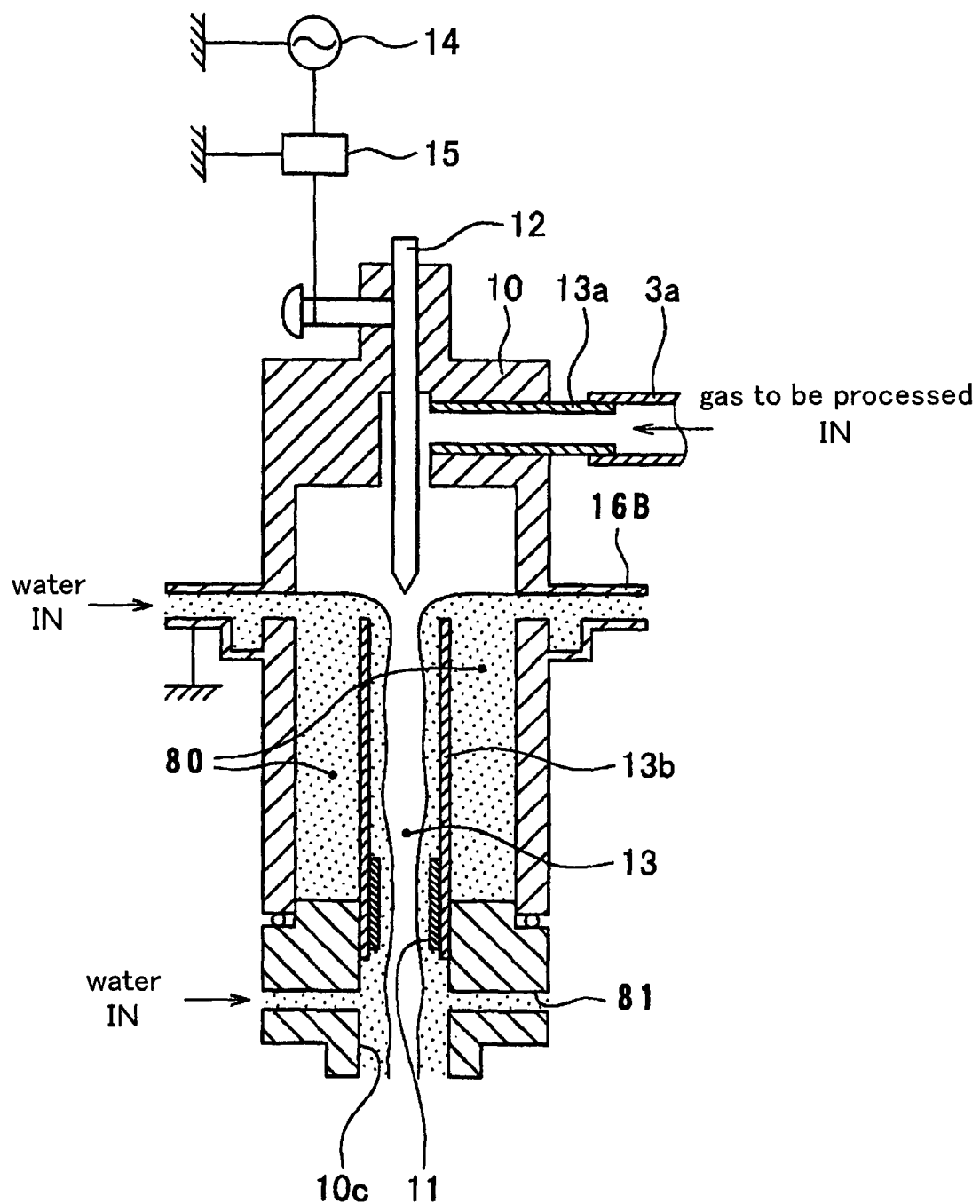
FIG. 24 is a sectional view of an essential portion showing another embodiment of the processing apparatus for subject A.

Embodiment shown in FIG. 24

In FIG. 24, the hollow body case 10 is provided at its upper portion with an introducing pipe 13a which introduces, into the body case 10, a harmful material such as exhaust gas to be processed. This introducing pipe 13a is connected to the exhaust pipe 3a of the roughing vacuum pump unit 3.

The body case 10 is formed at its lower end with an exhaust port 10c which brings an interior and an exterior of the body case 10 into communication with each other. The lower end of the body case 10 is provided with a cooling water passage 81 which supplies water into the exhaust port 10c.

In the body case 10, a reaction pipe 13b is perpendicularly mounted to an upper end of the exhaust port 10c, and an interior of the reaction pipe 13b serves as the reaction passage 13. If an inner diameter of the reaction pipe 13b is about 8 to 20 mm, it is possible to form plasma over the entire cross section of the reaction passage 13, and the preferable inner diameter thereof is about 15 mm because a harmful material can be processed efficiently. Examples of raw materials of the reaction pipe 13b are insulations such as alumina, aluminum nitride, silicon nitride, silicon carbide, boron nitride and the like.

In the reaction pipe 13b, the ground electrode 11 is provided along an inner surface of the reaction pipe 13b. Examples of raw materials of the ground electrode 11 are metals having high conductivity such as brass, copper and the like.

A preferable material for the ground electrode 11 is a metal such as gold and platinum having high conductivity and chemical stability, and the material is not limited to those only if the material can generate plasma.

The body case 10 is provided at its upper end with the high voltage electrode 12 made of platinum. A lower end of the high voltage electrode 12 is disposed in the vicinity of an upper end of the reaction pipe 13b. The power supply 14 is connected to an upper end of the high voltage electrode 12 through the matching circuit 15. This power supply 14 is a DC high voltage power supply or an AC high frequency power supply.

If the power supply 14 is the DC high voltage power supply, the matching circuit 15 is unnecessary.

Therefore, if voltage is applied from the power supply 14 to the high voltage electrode 12, electrical discharge is generated between the high voltage electrode 12 and the ground electrode 11, and plasma is formed on an interior, i.e., over the entire cross section of the reaction passage 13 from the reaction pipe 13b. Therefore, if a harmful material is introduced into the body case 10 from the introducing pipe 13a, the harmful material comes into contact with the plasma when the harmful material passes through the reaction pipe 13b, and the harmful material is decomposed into various gas components and then is exhausted outside.

Further, since the raw material of the high voltage electrode 12 is platinum, a surface of the high voltage electrode 12 can be maintained chemically stable. Therefore, it is possible to prevent the high voltage electrode 12 from being corroded by the harmful material.

Further, if water is supplied to the exhaust port 10c from the cooling water passage 81, water-soluble reaction product discharged from the reaction passage 13 can efficiently be absorbed by water and removed, and it is possible to prevent the exhaust side of the apparatus from being damaged by heat.

When the electrical discharge is started, if pulse voltage higher than voltage when the electrical discharge is started is applied to the ground electrode 11 or the high voltage electrode 12, it is possible to start the electrical discharge stably from an instant when the pulse voltage is applied.

When the electrical discharge is started, if high frequency voltage higher than voltage when the electrical discharge is started is applied to the ground electrode 11 or the high voltage electrode 12, it is possible to start the electrical discharge stably, and it is possible to reduce the applied voltage when the electrical discharge is started.

Further, if DC voltage is applied in between the ground electrode 11 and the high voltage electrode 12 to take place the electrical discharge, it is possible to always apply constant voltage in between the ground electrode 11 and the high voltage electrode 12 and thus, it is possible to stable the electrical discharge over the entire time. Especially, if negative voltage is applied to the high voltage electrode 12, it is possible to make the electrical discharge further stable.

Further, only a tip end of the high voltage electrode 12 may be made of platinum. As the high voltage electrode 12, it is possible to use a metal pipe, a metal rod, a carbon rod, a Ti—Pd alloy rod and the like, and the high voltage electrode 12 is not especially limited only if it can generate plasma.

A water reservoir 80 is formed between an outer periphery of the reaction pipe 13b and an inner surface of the body case 10 so as to surround the reaction pipe 13. Water is supplied to the water reservoir 80 from a water-supply pipe 16B provided in the body case 10. The water supplied to the water reservoir 80 is supplied into the reaction pipe 13b from an upper end of the water reservoir 80. Then, the water supplied into the reaction pipe 13b flows downward along an inner wall of the reaction pipe 13b, and forms a water layer over the entire surface of the inner wall of the reaction pipe 13b.

Since the water layer is formed over the entire surface of the inner wall of the reaction passage 13, the plasma and water come into contact over a wide area. Therefore, water vapor generated by the contact between the plasma and water can be entangled into plasma efficiently. Thus, the decomposition of the harmful material is facilitated, and the water-soluble reaction product can be absorbed in water efficiently. Thus, the decomposing and separating efficiency of the harmful material can be enhanced. Further, when the harmful material is solid or liquid, if the harmful material is supplied from the water-supply pipe 16B to the water reservoir 80 through the introducing pipe 13a alone or together with water and the harmful material is allowed to flow downward to the inner wall of the reaction passage 13 together with water, it is possible to bring the harmful material and plasma into contact with each other to decompose the harmful material.

Further, since the reaction pipe 13b is cooled by water in the water reservoir 80, it is possible to prevent a temperature of the wall surface of the reaction passage 13 from excessively increasing. Therefore, it is possible to prevent all the water flowing downward on the inner wall of the reaction passage 13 from being evaporated halfway through the reaction passage 13. Thus, since the inner wall of the reaction passage 13 is always covered with the water layer, erosion of the inner wall of the reaction passage 13 which may be caused by the reactive species can be prevented.

Furthermore, since the ground electrode 11 is provided along the inner surface of the reaction passage 13, water flows along the inner surface of the ground electrode 11. For this reason, the ground electrode 11 is automatically cooled, and erosion of the electrode can be suppressed. Further, since a harmful material passes inside the water layer formed on the inner surface of the ground electrode 11, the ground electrode 11 does not act as a resistance when the harmful material flows through the reaction passage 13.

If water to be supplied from the water-supply pipe 16B is previously heated, water heated by heat of plasma can become water vapor efficiently and thus, water vapor can be supplied to plasma efficiently.

Next, other embodiments of the processing apparatus for subject A will be explained based on FIGS. 25 to 28. Only structure peculiar to each embodiment will be explained below.

Figure 25:
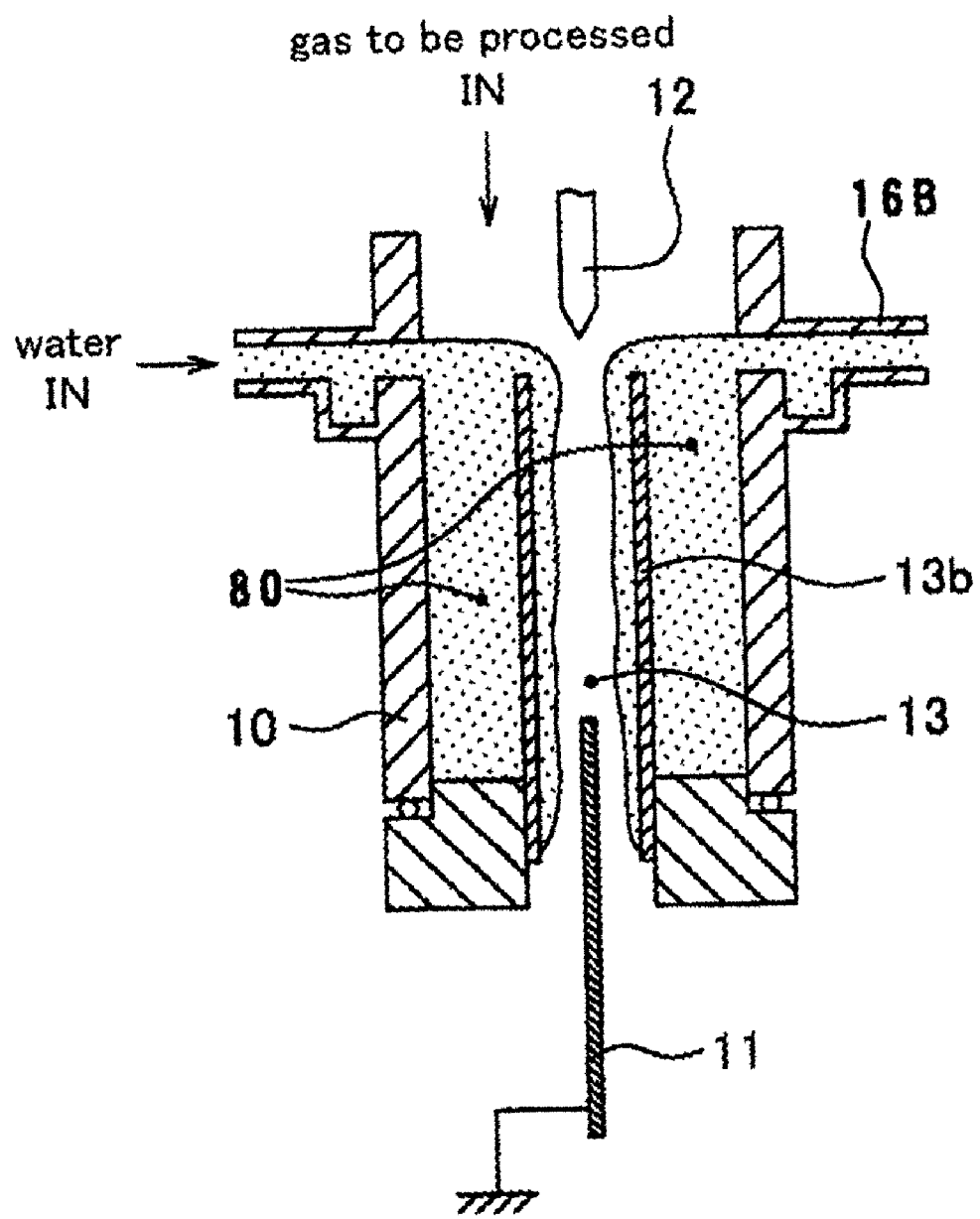
FIG. 25 is a sectional view of an essential portion showing another embodiment of the processing apparatus for subject A.

Embodiment shown in FIG. 25

In this embodiment, the ground electrode 11 is a rod-like electrode which is in parallel to a center axis of the reaction passage 13.

As shown in FIG. 25, the rod-like ground electrode 11 is provided on a center axis of the reaction pipe 13b, i.e., on a center axis of the reaction passage 13.

Therefore, the ground electrode 11 is not completely covered with water which flows downward along the inner wall of the reaction pipe 13b, and a portion of the ground electrode 11 is exposed from the water layer without fail. Thus, plasma formed between the ground electrode 11 and the high voltage electrode 12 comes into contact directly with the ground electrode 11 and therefore, power loss which may be caused by water can be eliminated.

Figure 26:
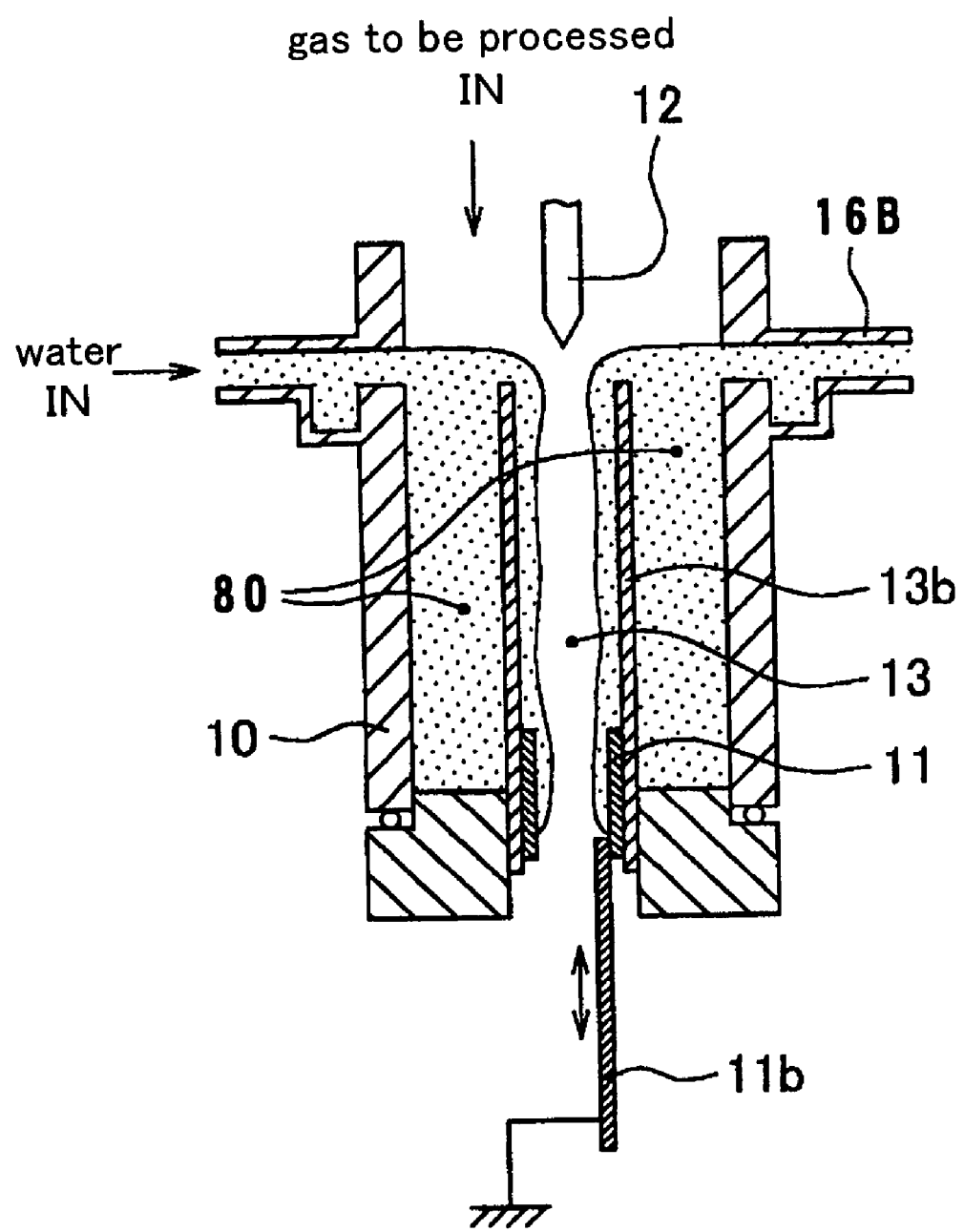
FIG. 26 is a sectional view of an essential portion showing another embodiment of the processing apparatus for subject A.

Embodiment shown in FIG. 26

In this embodiment, the ground electrode 11 is vertically movably provided in the reaction pipe 13b.

As shown in FIG. 26, the ground electrode 11 is vertically slidably mounted on the inner surface of the reaction pipe 13b. A supporting rod 11b is mounted to a lower end of the ground electrode 11. The supporting rod 11b is vertically movably mounted in a case of the processing apparatus for subject A which is not drawn along a center axis of the reaction pipe 13b.

Therefore, if the supporting rod 11b is vertically moved along inner surfaces of the ground electrode 11 and the reaction pipe 13b, it is possible to vary a distance between the ground electrode 11 and the high voltage electrode 12.

Therefore, if the ground electrode 11 is upwardly moved to shorten the distance between the ground electrode 11 and the high voltage electrode 12 when the electrical discharge is started, it is possible to easily form plasma, and to reduce the voltage when the electrical discharge is started.

Further, after the plasma is formed, if the ground electrode 11 is downwardly moved along the reaction pipe 13b, it is possible to form plasma long along the reaction passage 13 and thus, the reacting area between the plasma and a harmful material can be increased. Thus, the decomposing and separating efficiency of the harmful material can be enhanced.

When the ground electrode 11 is vertically moved, if voltage is controlled such that the electrical discharge current is maintained at a constant value of higher, it is possible to move the ground electrode 11 in a state in which plasma is held stabilized.

Further, a method for vertically swinging the ground electrode 11 is not limited to the above-described method. It is possible to employ a method in which a magnetic substance such as an iron piece is fixed to the ground electrode 11, and the ground electrode 11 is moved from outside using a magnet. When a cylindrical reaction pipe 13b is used, it is possible to employ a method in which a helical groove is formed in the inner wall of the reaction pipe 13b, a projection which can slidably be engaged with the groove is provided on the ground electrode 11, the ground electrode 11 is rotated around its center axis to move the ground electrode 11 vertically. The method is not especially limited only if the ground electrode 11 can vertically be moved along the center axis of the reaction pipe 13b.

Figure 27:
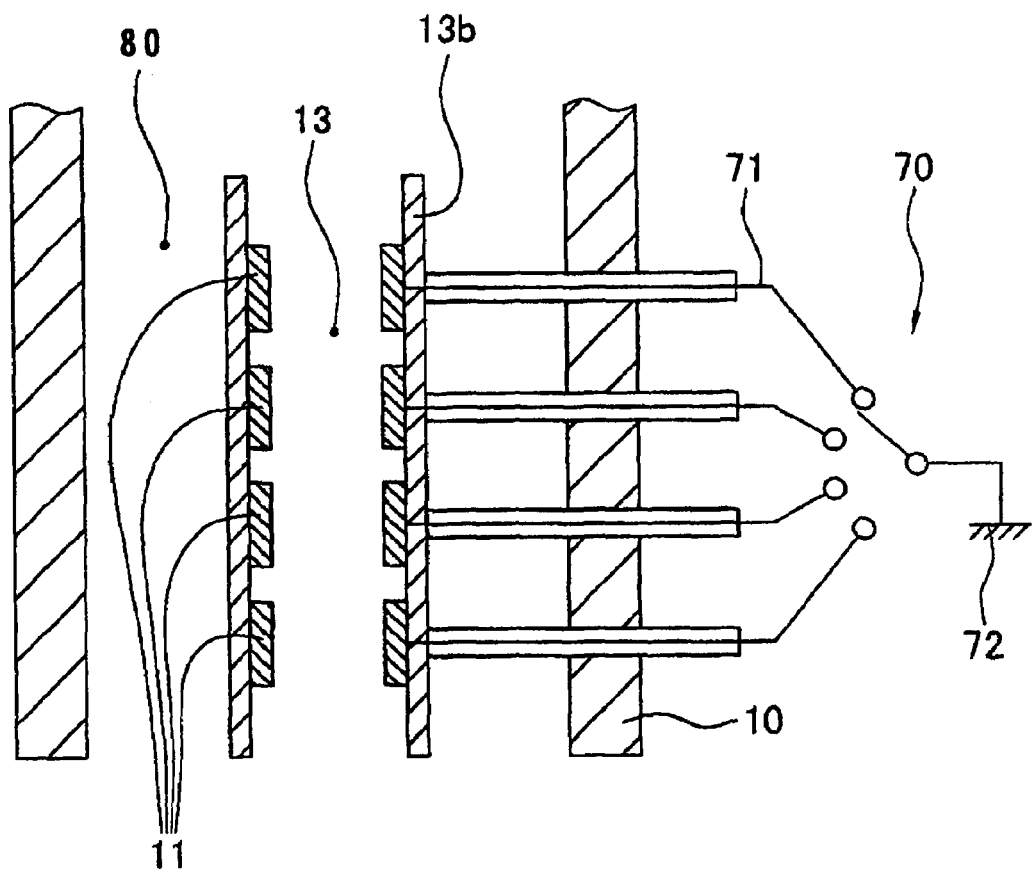
FIG. 27 is a sectional view of an essential portion showing another embodiment of the processing apparatus for subject A.

Embodiment shown in FIG. 27

In this embodiment, a plurality of ground electrodes 11 are provided in the inner wall of the reaction pipe 13b along a center line of the reaction pipe 13b. As shown in FIG. 27, the plurality of ground electrodes 11 are independently provided in the inner wall of the reaction pipe 13b along the center line of the reaction pipe 13b. The ground electrodes 11 are respectively connected to the switching circuit 70 through a plurality of electric wires 71. The switching circuit 70 are a switch and the like using a relay circuit or a semiconductor. The switching circuit 70 switches over the electric wires 71 and the ground electrodes 11.

Therefore, if the ground electrode 11 to be connected to a ground 72 is switched over, it is possible to increase and reduce a distance between the high voltage electrode 12 and the ground electrode 11 which receives electrical discharge from the high voltage electrode 12. Thus, if a ground electrode 11 which is close to the high voltage electrode 12 is energized when the electrical discharge is started, it is possible to easily form plasma.

If a ground electrode 11 to be energized is changed to another ground electrode 11 which is further from the high voltage electrode 12 in sequence after plasma is formed, a length of the plasma can be increased. Therefore, since a space where the plasma and the harmful material are reacted with each other is increased, the decomposing and separating efficiency of the harmful material can be enhanced. Further, since the length of the plasma can be changed only by changing the ground electrode 11 to be energized, a structure of the apparatus can be simplified.

The switching circuit 70 is not limited to the above-described circuit only if the switching circuit 70 can switch over the connection with the ground electrodes 11.

Figure 28:
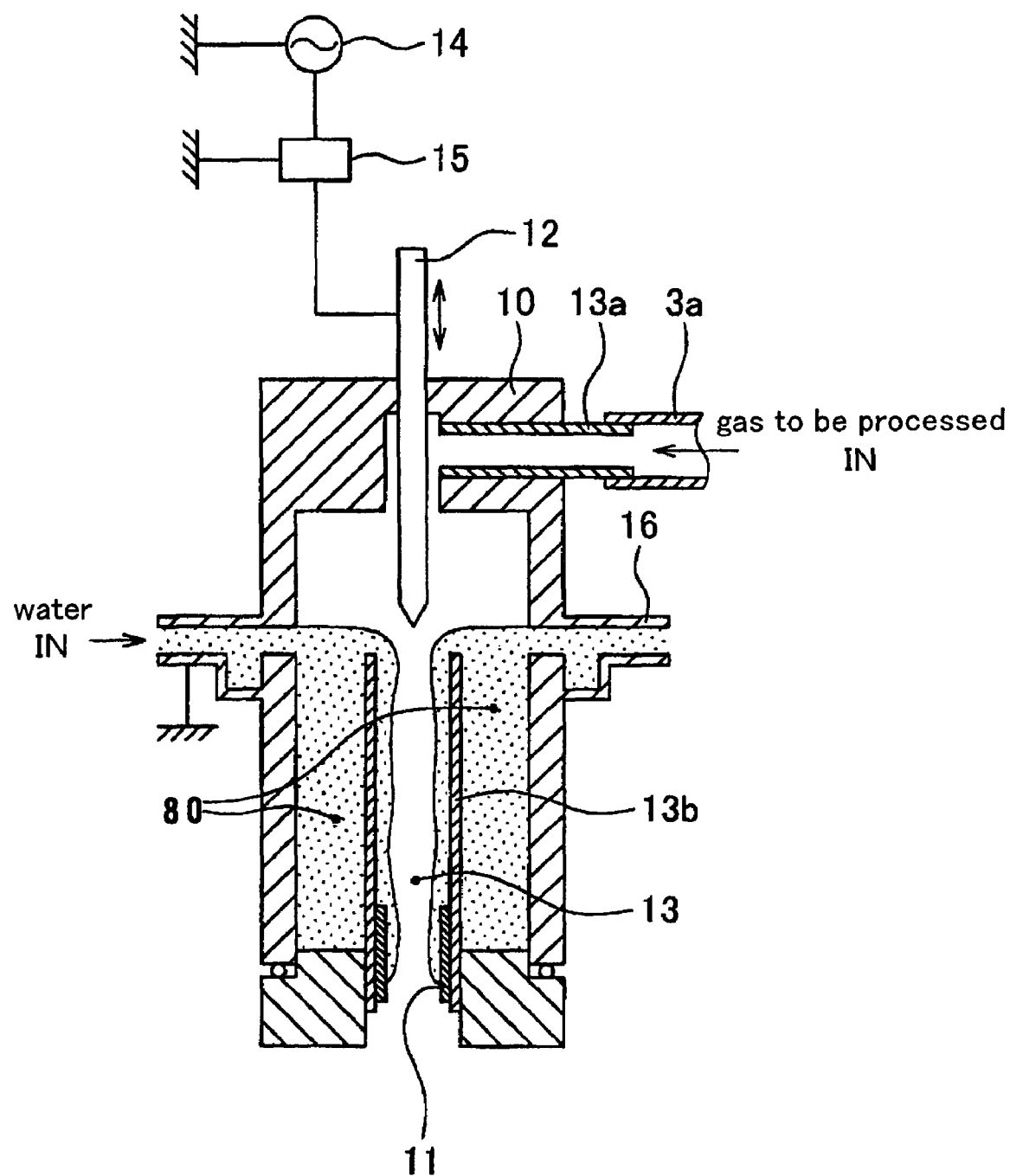
FIG. 28 is a sectional view of an essential portion showing another embodiment of the processing apparatus for subject A.

Embodiment shown in FIG. 28

In this embodiment, the high voltage electrode 12 is vertically movably provided. As shown in FIG. 28, the rod-like high voltage electrode 12 is provided coaxially with a center axis of the reaction pipe 13b, and the high voltage electrode 12 is mounted to an upper end of the body case 10 such that the high voltage electrode 12 can vertically move along the center axis of the reaction pipe 13b.

Therefore, when the electrical discharge is started, if the high voltage electrode 12 is brought close to the reaction passage 13, it is possible to easily form plasma. If the high voltage electrode 12 is moved away from the reaction passage 13 after the plasma is formed, a length of the plasma is increased, a space where the plasma and the harmful material are reacted with each other is increased and thus, the decomposing and separating efficiency of the harmful material can be enhanced. Further, when the harmful material is gas, since it is possible to increase a reaction amount between the plasma and the harmful material whose flowing speed before entering the reaction passage 13 is slow, the decomposing efficiency of the harmful material can be enhanced.

A method for vertically swinging the high voltage electrode 12 is not limited and any method can be employed only if the high voltage electrode 12 can be vertically moved along the center axis of the reaction pipe 13b.

INDUSTRIAL APPLICABILITY

According to the present invention, even fluorocompound such as PFC including $CF_4$ can effectively be decomposed because such compound is brought into contact with plasma in a narrow space for sufficient time. Since the structure of the apparatus is small and simple, the apparatus can be added to each process chamber.

Further, according to the invention, the exhaust gas is influenced by plasma while passing through a long distance in a narrow cross section and thus, the decomposition efficiency of the exhaust gas becomes high.

Further, according to the invention, if absorbent is charged into the plasma chamber on the outlet side of the reaction passage, the decomposed gas components can be collected.

Further, according to the invention, if the wool-like buffering agent is used, it is possible to disperse the powder absorbent in the plasma chamber substantially uniformly and thus, the gas can be collected effectively.

Further, according to the invention, since water or water vapor is supplied in the vicinity of plasma, a water-soluble reaction product in the exhaust gas can swiftly be discharged from vapor phase, and decomposition can be facilitated.

Further, according to the invention, since the plasma generated in the reaction passage is allowed to contact water or water vapor, the reaction time of plasma becomes long, and decomposition can further be facilitated.

Further, according to the invention, even if the amount of flow of the exhaust gas is small, it is possible to fully fill the reaction passage with plasma.

Further, according to the invention, since water in the water reservoir becomes a liquid electrode, plasma is generated between the high voltage electrode and the water surface, and the exhaust gas is decomposed while passing through this plasma region. Among the decomposed components, water-soluble component is collected in water and thus, the water-soluble component can be discharged together with water and disposed.

Further, according to the invention, water which was evaporated from water surface below the reaction passage made of insulating material is returned into the water reservoir through an outside of a substantially truncated conical insulating material. Therefore, a waterdrop is not attached to the reaction passage, and disturbance is prevented from being applied to electric discharge.

Further, according to the invention, since plasma generated in the reaction passage is allow to approach and water or water vapor is supplied, the reaction with water becomes most active, and decomposition of the exhaust gas can be facilitated.

Further, according to the invention, since hot water or water vapor which was heated while passing through the waterway can be supplied into the reaction passage, reaction between plasma and water is effectively carried out, and decomposition is facilitated.

Further, according to the invention, a harmful material can be decomposed efficiently, and even if the harmful material is fluorocompound such as PFC including $CF_4$, the harmful material can effectively be decomposed, the apparatus has a small and simple structure, and the apparatus can be added to each process chamber. Further, the decomposition of the harmful material is facilitated, and since a water-soluble reaction product can efficiently be absorbed in water and thus, the decomposing and separating efficiency of a harmful material can be enhanced.

Further, according to the invention, since the reaction passage inner wall is always covered with the water layer, it is possible to prevent erosion of the reaction passage inner wall which may be caused by reactive species.

Further, according to the invention, the ground electrode is automatically cooled, and it is possible to suppress the erosion of the electrode. Further, the ground electrode does not act as a resistance when the harmful material flows through the reaction passage.

Further, according to the invention, since the ground electrode comes into contact directly with plasma, power loss caused by water resistance can be eliminated.

Further, according to the invention, it is possible to easily form plasma when the electrical discharge is started. Further, since a space where plasma and a harmful material are reacted with each other after the plasma is formed can be increased, the decomposing and separating efficiency of a harmful material can be enhanced.

Further, according to the invention, if the ground electrode which is close to the high voltage electrode is energized when electrical discharge is started, plasma can be formed easily. After plasma is formed, if a ground electrode to be energized is changed to a ground electrode which is away from the high voltage electrode in sequence, a length of the plasma can be increased. Therefore, since the space where the plasma and a harmful material are reacted can be increased, decomposition and separation efficiency of the harmful material can be enhanced. Further, since the length of plasma can be changed only by changing an electrode to be energized, a structure of the apparatus can be simplified.

Further, according to the invention, it is possible to easily form plasma when the electrical discharge is started. Further, since a space where plasma and a harmful material are reacted with each other after the plasma is formed can be increased, the decomposing and separating efficiency of a harmful material can be enhanced. It is also possible to enhance the decomposing efficiency of the harmful material.

Further, according to the invention, it is possible to keep a surface of the high voltage electrode chemically stable, it is possible to prevent erosion of the electrode which may be caused by the harmful material.

Further, according to the invention, a water-soluble reaction product discharged from the flow-outside of the reaction passage can efficiently be absorbed by water and removed, and it is possible to prevent the exhaust side of the apparatus from being damaged by heat.

Further, according to the invention, since the exhaust gas can be decomposed under atmospheric pressure, it is possible to reduce the processing apparatus for subject in size. Since the exhaust gas is processed on the flow-out side of the roughing vacuum pump, water does not reversely flow toward the process chamber, the plasma system is not damaged and its lifetime is not shortened. It is easy to add the apparatus to each process chamber.

Further, according to the invention, gas which was not decomposed by a first processing apparatus for subject provided in the roughing vacuum pump and remained can be decomposed by a second processing apparatus on the flow-out side of the roughing vacuum pump. Therefore, it is possible to further enhance the decomposing efficiency of exhaust gas.

The invention claimed is:

1. A processing apparatus for a subject comprising:
a thin and long capillary reaction passage through which a to-be-processed subject passes, a high voltage electrode disposed on one end of said reaction passage,
a ground electrode disposed on the other end of said reaction passage, said reaction passage forming a cylindrical inner wall on its inner side, and
a source of water,
wherein water is allowed to flow through at least a portion of said cylindrical inner wall of said reaction passage, and said high voltage electrode and said ground electrode are configured to generate a plasma in an axial direction of said reaction passage under atmospheric pressure, said plasma being spread over the entire cross section of said reaction passage; and
wherein said inner wall of said reaction passage is entirely covered with a water film.

2. The processing apparatus for a subject according to claim 1, wherein said high voltage electrode is disposed on a flow-in side of said reaction passage.

3. The processing apparatus for a subject according to claim 1, wherein a plasma chamber is provided on a flow-out side of said reaction passage.

4. The processing apparatus for a subject according to claim 1, wherein a portion of said reaction passage is formed of said ground electrode.

5. The processing apparatus for a subject according to claim 1, wherein water is supplied from a flow-in side of said reaction passage, said water is drained from a flow-out side of said reaction passage.

6. The processing apparatus for a subject according to claim 1, wherein a water reservoir is formed in an outer periphery of said reaction passage, water in said water reservoir is supplied to said reaction passage.

7. The processing apparatus for a subject according to claim 6, wherein water in said water reservoir is supplied into said reaction passage from an end of a flow-in side end of said reaction passage.

8. A processing apparatus for a subject, comprising:
a reaction passage being formed of an insulating material between a high voltage electrode and a ground electrode, said high voltage electrode being disposed on a flow-in side of said reaction passage,
a water reservoir being provided on a flow-out side of said reaction passage,
wherein said high voltage electrode and said ground electrode are configured to generate a plasma in an axial direction of said reaction passage under atmospheric pressure, said plasma being spread over the entire cross section of the reaction passage, and
wherein said water reservoir is disposed on an upper surface of said ground electrode.

9. The processing apparatus for a subject according to claim 8, wherein a flow-out side end of said reaction passage is disposed below a water surface in said water reservoir.

10. The processing apparatus for a subject according to claim 8, wherein said flow-out side of said reaction passage is supplied with water or water vapor after it was brought into contact with plasma is drained.

11. The processing apparatus for a subject according to claim 8, further comprising:
a waterway is provided around said reaction passage, water which passes through said waterway and which is heated is supplied into said reaction passage.

12. The processing apparatus for a subject comprising:
a high voltage electrode and a ground electrode in which plasma is generated under atmospheric pressure in a reaction passage through which a to-be-processed subject passes, wherein said high voltage electrode is disposed on the flow-in side of said reaction passage, and said ground electrode is disposed in said reaction passage, and
a source of water,
wherein water is allowed to flow downward along an inner wall of said reaction passage, and said plasma is generated in an axial direction of said reaction passage, said plasma being spread over the entire cross section of the reaction passage, and
wherein a water reservoir surrounds said reaction passage.

13. The processing apparatus for a subject according to claim 12, wherein said ground electrode is provided on said inner wall of said reaction passage.

14. The processing apparatus for a subject according to claim 12, wherein said ground electrode is provided on a center axis of said reaction passage.

15. The processing apparatus for a subject according to claim 12, wherein said ground electrode is movably provided in a longitudinal direction of said reaction passage.

16. The processing apparatus for a subject according to claim 12, wherein plural ground electrodes are provided.

17. The processing apparatus for a subject according to claim 12, wherein said high voltage electrode is provided such that it can move toward and away from said reaction passage.

18. The processing apparatus for a subject according to claim 12, wherein said high voltage electrode is made of platinum.

19. The processing apparatus for a subject according to claim 12, wherein said water is allowed to flow out from the flow-out side of said reaction passage.

20. A processing apparatus for a subject comprising:
a high voltage electrode and a ground electrode for generating plasma in a reaction passage through which a to-be-processed subject passes under atmospheric pressure,
wherein said high voltage electrode is disposed on a flow-in side of said reaction passage,
said ground electrode is disposed on a flow-out side of said reaction passage and is provided on a bottom of a water reservoir;
said plasma is generated in an axial direction of said reaction passage by said high voltage electrode and said ground electrode, and
said water reservoir is surrounds said reaction passage.

21. The processing apparatus for the subject according to claim 20, wherein a heater for heating water to be supplied to said reaction passage is provided in said water reservoir.

* * * * *